United States Patent [19]

Hirahara et al.

[11] Patent Number: 4,890,121
[45] Date of Patent: * Dec. 26, 1989

[54] HALFTONE IMAGE PRINTING DEVICE

[75] Inventors: Shuzo Hirahara, Yokohama; Hitoshi Nagato; Kazuhiko Higuchi, both of Kawasaki; Kiyoshi Yamada, Chigasaki; Tadayoshi Ohno, Kawasaki; Tsutomu Kanai, Yokohama, all of Japan

[73] Assignee: Kabushiki Kaisha Toshiba, Kawasaki, Japan

[*] Notice: The portion of the term of this patent subsequent to Feb. 9, 2005 has been disclaimed.

[21] Appl. No.: 41,875

[22] Filed: Apr. 23, 1987

Related U.S. Application Data

[63] Continuation-in-part of Ser. No. 821,954, Jan. 24, 1986.

[30] Foreign Application Priority Data

Jan. 31, 1985 [JP] Japan ................... 60-16768
Jun. 28, 1985 [JP] Japan ................... 60-142108
Sep. 24, 1985 [JP] Japan ................... 60-208823
Apr. 23, 1986 [JP] Japan ................... 61-93843

[51] Int. Cl.$^4$ .................... G01D 15/10; H04N 1/23; B41J 3/20
[52] U.S. Cl. .................... 346/76 PH; 358/296; 358/298; 400/120
[58] Field of Search ............ 346/76 PH; 358/298, 358/296, 283; 400/120

[56] References Cited

U.S. PATENT DOCUMENTS

| | | | |
|---|---|---|---|
| 3,710,913 | 1/1973 | Brennan, Jr. et al. | 400/320 |
| 3,922,484 | 11/1975 | Keller | 358/256 |
| 4,333,112 | 1/1982 | Matsumoto | 358/298 |
| 4,368,491 | 1/1983 | Saito | 358/283 |
| 4,394,693 | 7/1983 | Shirley | 358/298 |
| 4,412,225 | 10/1983 | Yoshida et al. | 346/1.1 |
| 4,531,160 | 7/1985 | Ehn | 358/240 |
| 4,532,523 | 7/1985 | Tanaka | 346/76 PH |
| 4,536,771 | 8/1985 | Tanaka | 346/76 PH |
| 4,563,691 | 1/1986 | Noguchi et al. | 346/76 PH |
| 4,578,713 | 3/1986 | Tsao et al. | 358/283 |
| 4,595,956 | 6/1986 | Kawamura et al. | 358/283 |

FOREIGN PATENT DOCUMENTS

| | | | |
|---|---|---|---|
| 59-179363 | 11/1984 | Japan | 400/120 |
| 60-78768 | 4/1985 | Japan | 400/120 |

Primary Examiner—Clifford C. Shaw
Assistant Examiner—Gerald E. Preston
Attorney, Agent, or Firm—Oblon, Spivak, McClelland, Maier & Neustadt

[57] ABSTRACT

A halftone image printing device represents an image using a pixel matrix, prints each pixel as a dot pattern constituted by predetermined dots in a dot matrix, and controls the dot pattern and the printing density (multilevel density) of each dot included in the dot pattern in accordance with the density (multilevel) of the pixel. An overall printing density range is divided into four density ranges, i.e., from the lowest to the highest density ranges, and each pixel is defined by a 3×3 dot matrix. A dot pattern in the lowest density range has a dot at the center of the matrix, a dot pattern in the next lowest range has dots at the center of the matrix and at positions above and to the right of the center, a dot pattern in the next highest density range has dots at the center of the matrix and at positions above, below, and to the right and left of the center, and a dot pattern in the highest density range has dots at the center of the matrix and at positions above, below, to the right, left, and upper right of the center. In order to print each dot at each density level in each density range, the level of energy supplied to the heating element of the thermal head corresponding to each dot is precisely controlled.

14 Claims, 32 Drawing Sheets

FIG. 2A  FIG. 2B  FIG. 2C
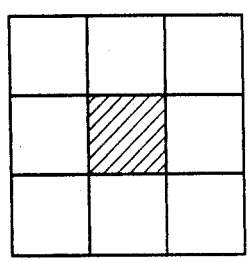 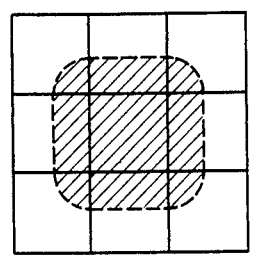 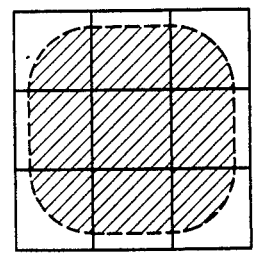
FIG. 3
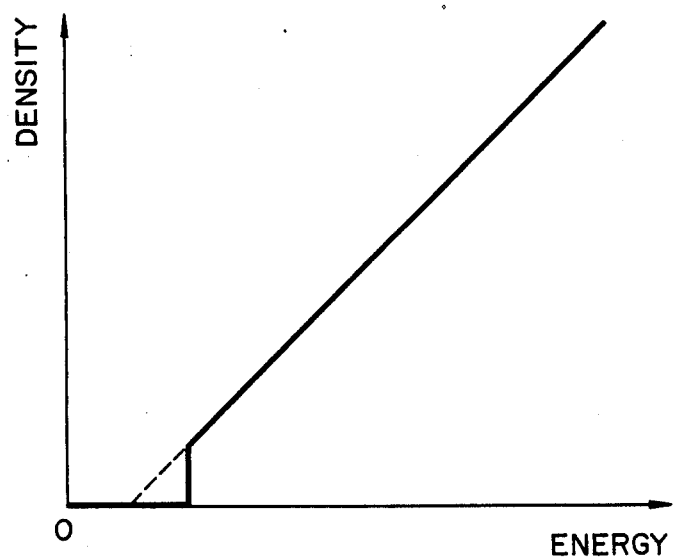

FIG. 6
| HALF-TONE GRADATION LEVEL | MULTI LEVEL DOT PATTERN |
|---|---|
| 0~4 | 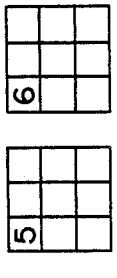 |
| 5~14 | 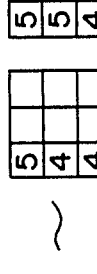 |
| 15~30 | 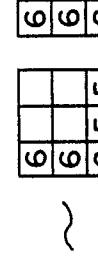 |

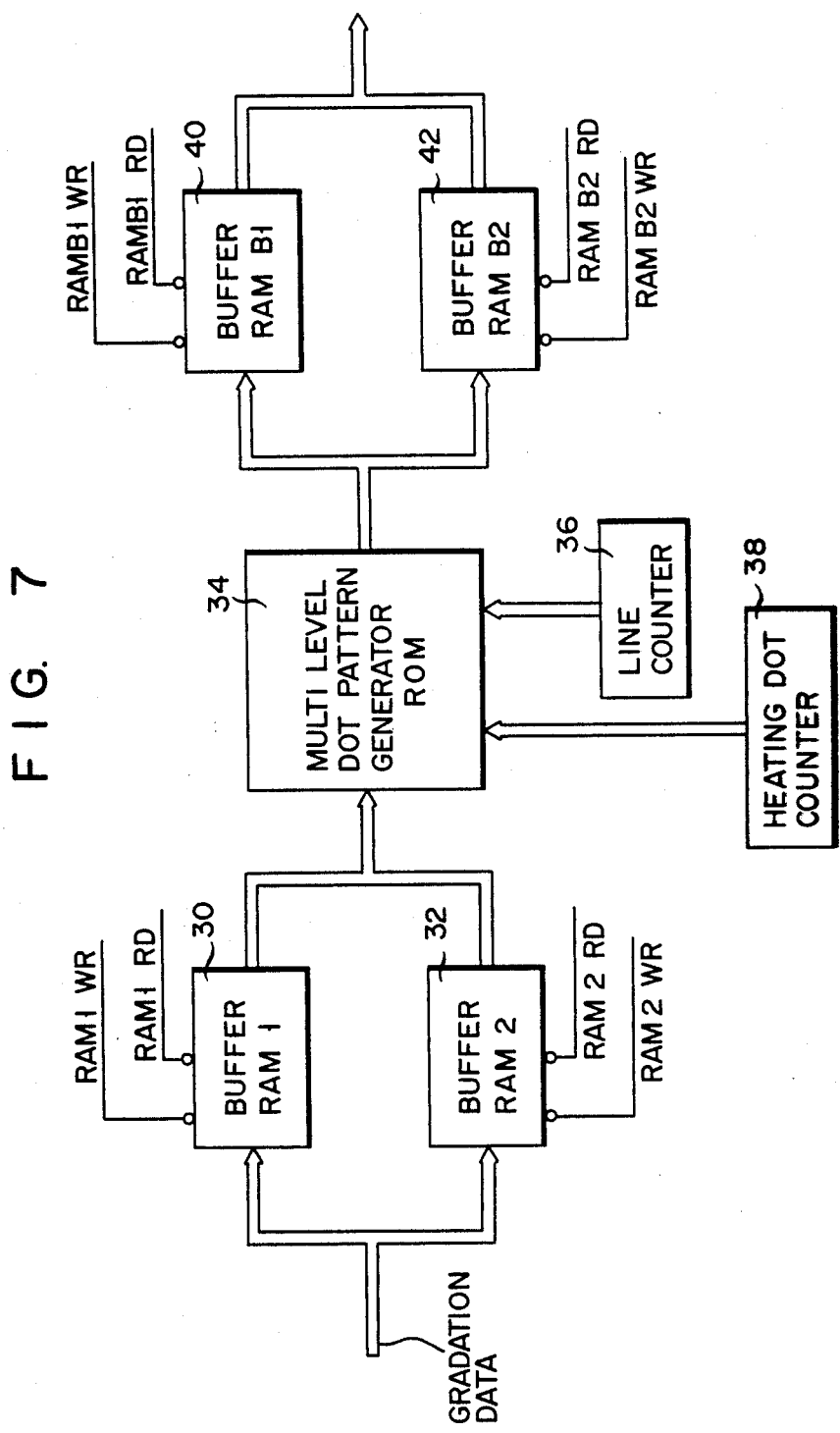

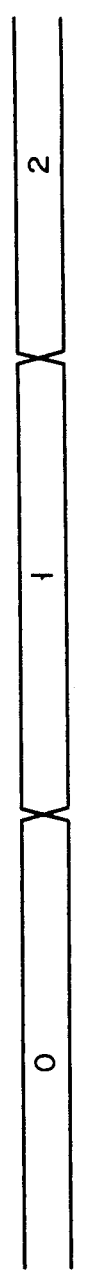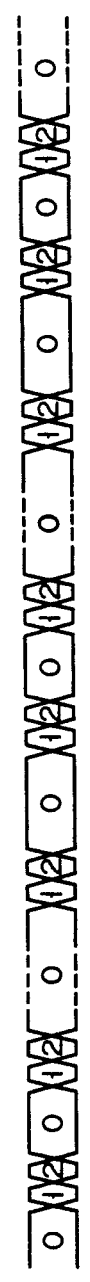
FIG. 8A (RAM1 RD)
FIG. 8B (LATCH)
FIG. 8C (RAM B1 WR)
FIG. 8D (LINE)
FIG. 8E (BIT)
FIG. 8F (RAM B2 WR)
FIG. 8G (RAM B1 RD)
FIG. 8H (RAM B2 RD)

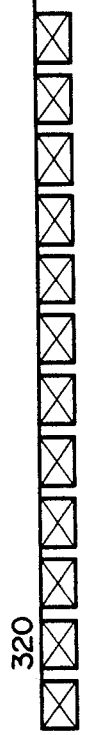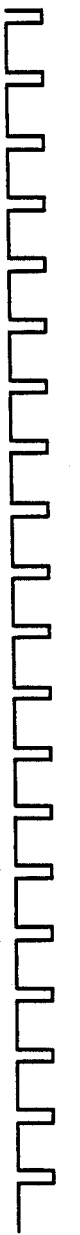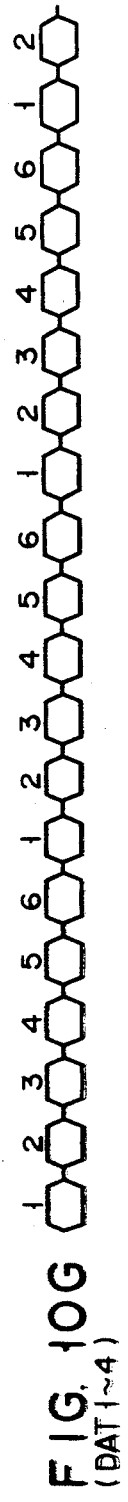
FIG. 10A (RAM B1 RD)
FIG. 10B (RAM B2 RD)
FIG. 10C (CLK)
FIG. 10D (LATCH)
FIG. 10E (EN 1)
FIG. 10F (EN 2)
FIG. 10G (DAT 1~4)

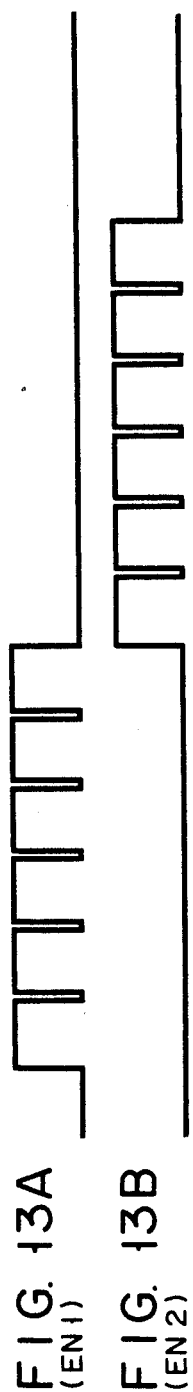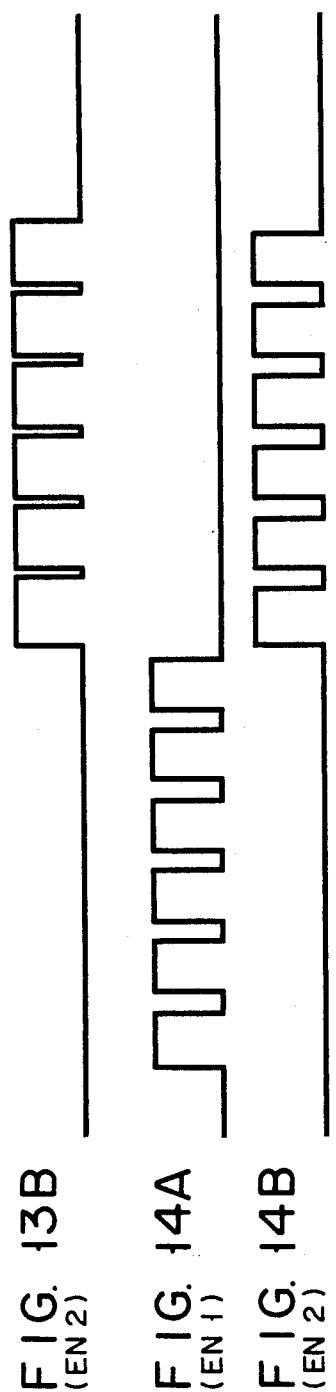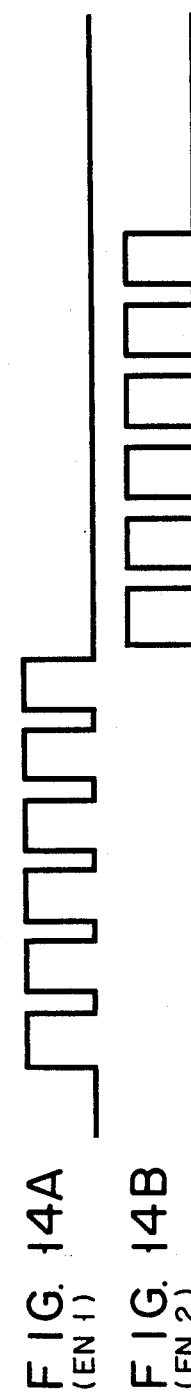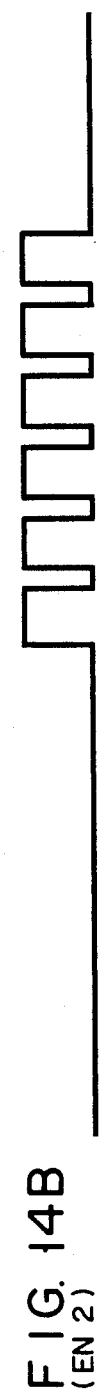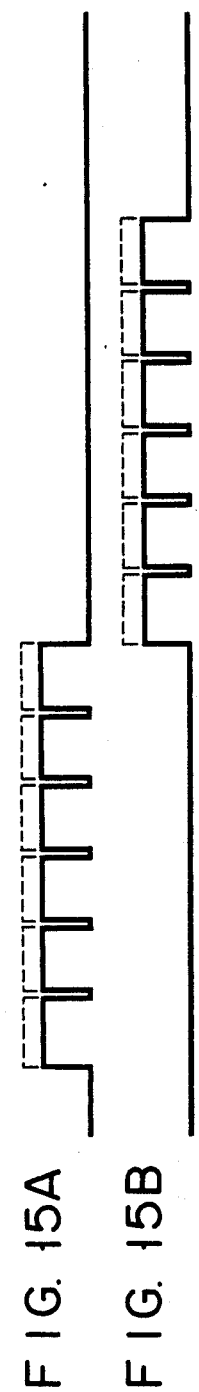
FIG. 13A (EN 1)
FIG. 13B (EN 2)
FIG. 14A (EN 1)
FIG. 14B (EN 2)
FIG. 15A
FIG. 15B

FIG. 21

FIG. 23A  FIG. 23B  FIG. 24A  FIG. 24B
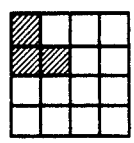 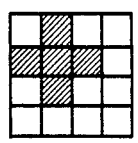 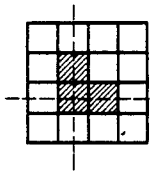 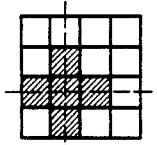
FIG. 23C  FIG. 23D  FIG. 24C  FIG. 24D
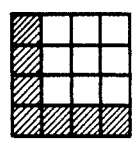 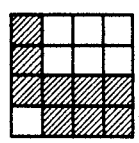 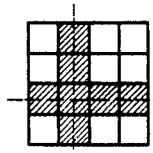 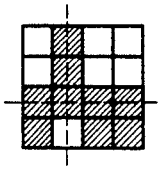
FIG. 25A
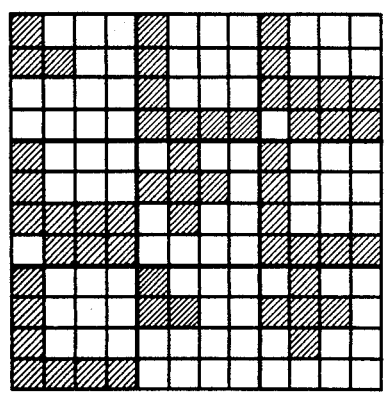
FIG. 25B
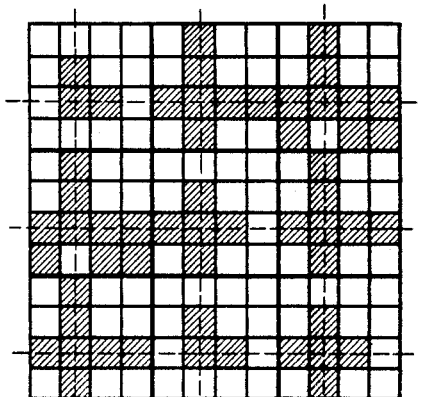
FIG. 26A
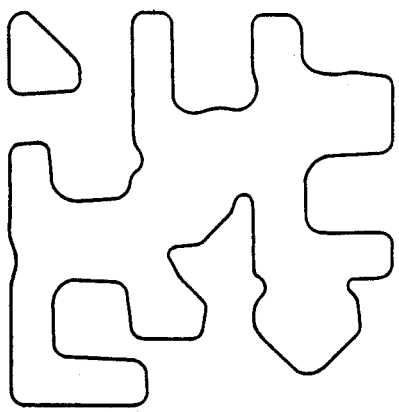
FIG. 26B
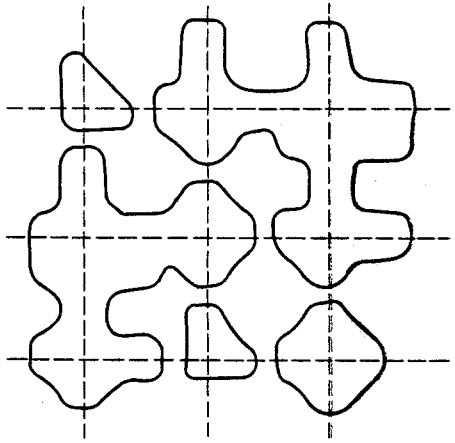

MAIN SCANNING DIRECTION

SUB SCANNING DIRECTION

F I G. 43
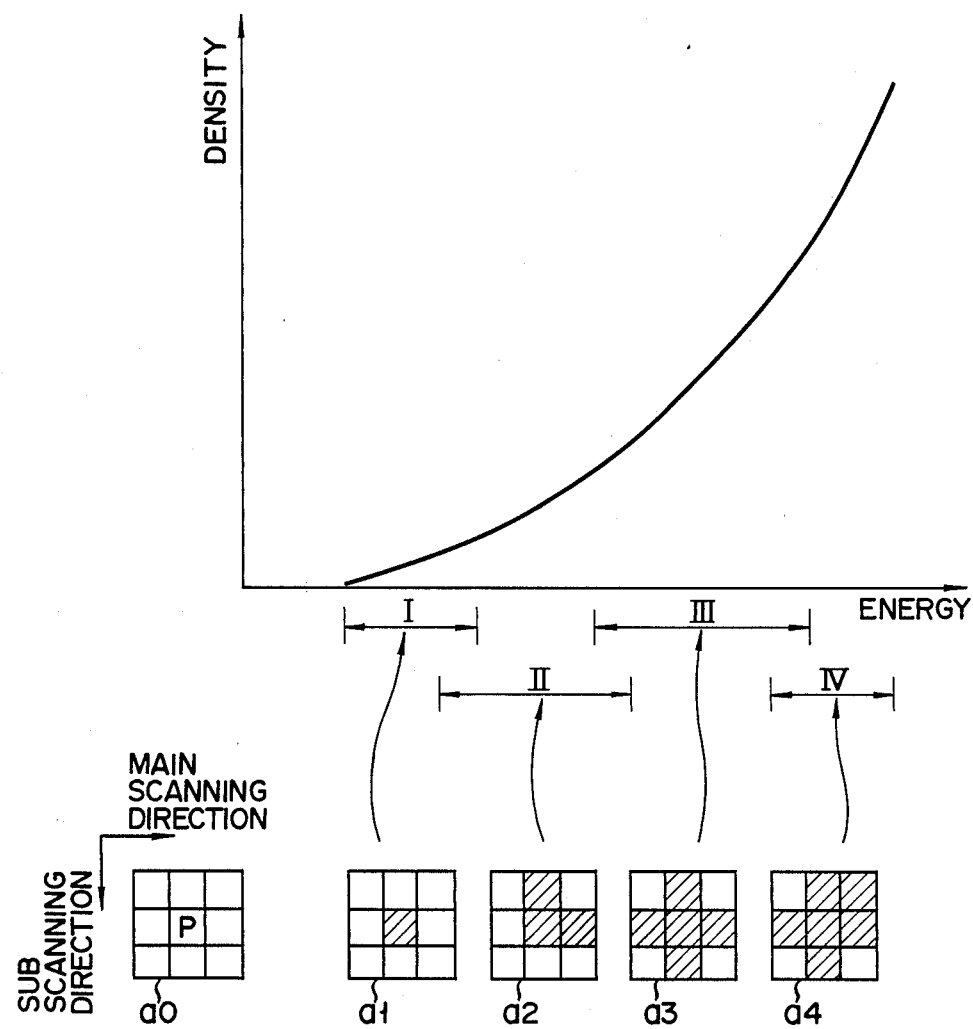

FIG. 44

| HALF-TONE GRADATION LEVEL | MULTI LEVEL DOT PATTERN |
|---|---|
| 0 ~ 6 | |
| 7 ~ 18 | |
| 19 ~ 30 | |
| 31 ~ 36 | |

F I G. 46A 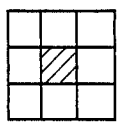
F I G. 46B 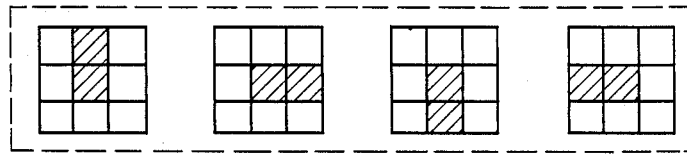
F I G. 46C 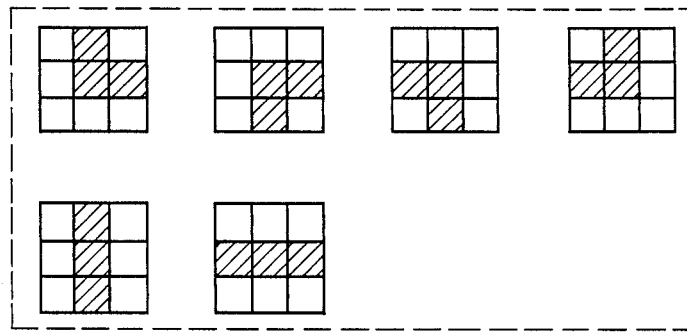
F I G. 46D 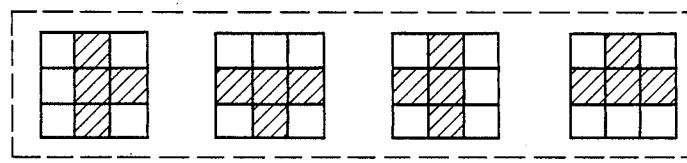

FIG. 47
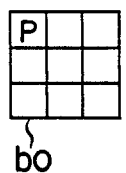 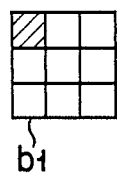 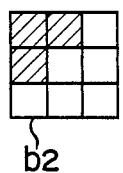 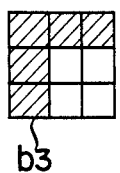 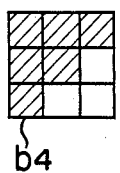 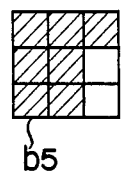
b0    b1    b2    b3    b4    b5

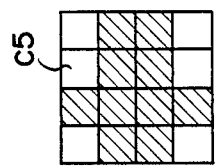
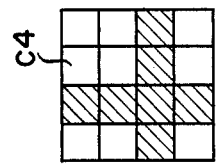
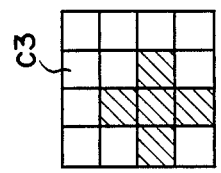
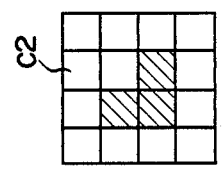
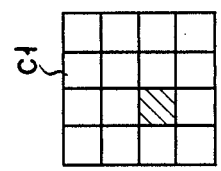
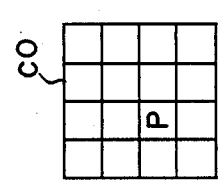
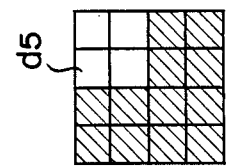
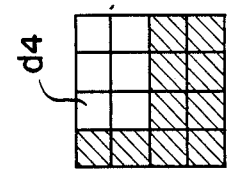
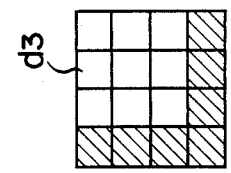
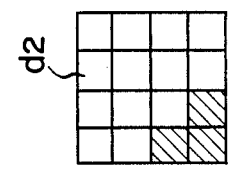
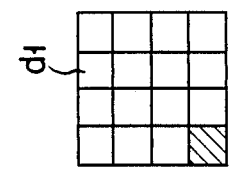
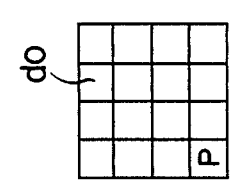
F I G. 48
F I G. 49

F I G. 50
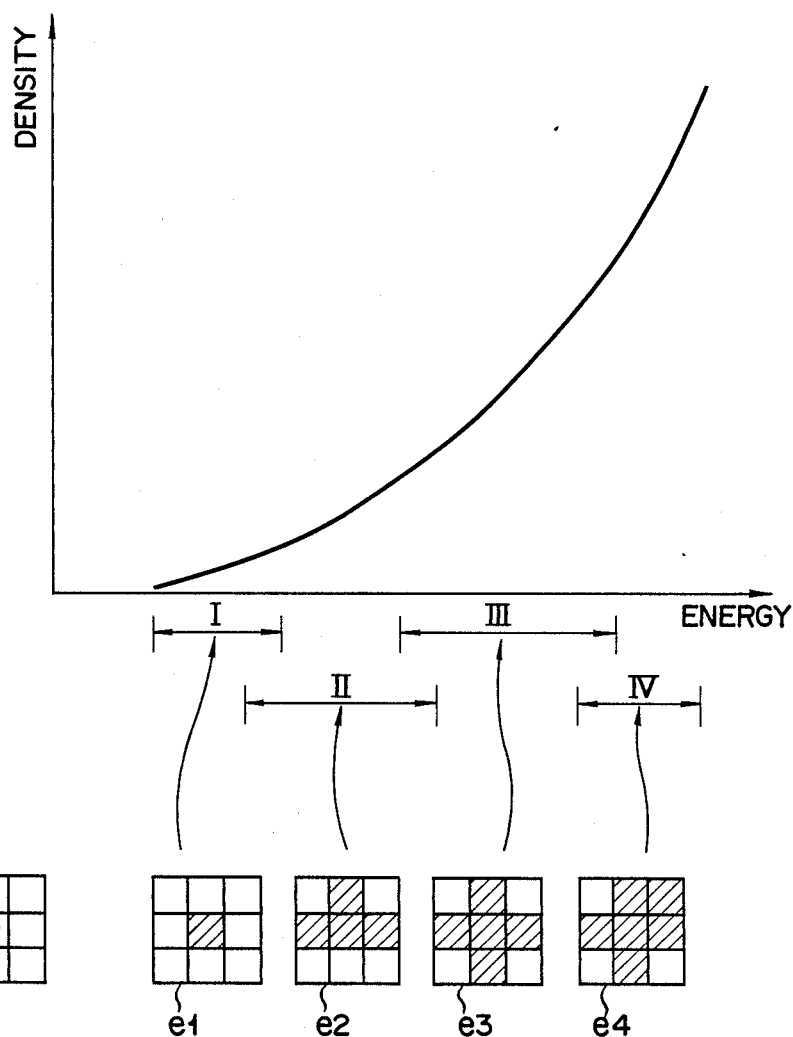
F I G. 51
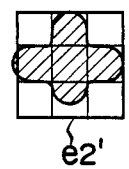
e2'

FIG. 52

| HALF-TONE GRADATION LEVEL | MULTI LEVEL DOT PATTERN |
|---|---|
| 0 ~ 6 | |
| 7 ~ 19 | |
| 20 ~ 30 | |
| 31 ~ 36 | |

HALFTONE IMAGE PRINTING DEVICE

CROSS-REFERENCE TO THE RELATED APPLICATION

This application is a continuation-in-part application of Ser. No. 821,954 "Thermal transfer printing apparatus" filed Jan. 24, 1986.

BACKGROUND OF THE INVENTION

The present invention relates to a halftone image printing device, and, more particularly, to a halftone image printing device in which a pixel is formed by a plurality of dots in a matrix form, and can be printed in a halftone mode, or with gradation or gray levels.

In a halftone image printing device, a thermal head (printing head) is urged against printing paper through an ink film (normally having a ribbon-shape), and an ink on the ink film is melted by heat generated when heating resistors constituting the thermal head are energized. Thus, the melted ink is transferred to the printing paper so as to form a dot image corresponding to the energized resistors. In this apparatus, each dot can only be binary-controlled as to whether or not the ink is transferred. Therefore, in order to print a halftone image such as a picture, a so-called binary area modulation method is generally adopted. In this method, a pixel must correspond to a plurality of dots in a matrix form. The number of dots which are energized and subjected to ink transferring, however, changes in accordance with the density of a pixel. A DITHER method, a micro-font method or the like are well known as binary area modulation methods.

However, the number of levels able to be represented by this area modulation method is limited. When a pixel has an n×n dot matrix configuration, the number of levels expressed is $n^2+1$, including 0 level (the level of the printing paper). For example, in the case of a 4×4 dot matrix, 17 levels are provided. In general, a color image requires a resolution of 4 dots/mm or higher, and each color component requires 64 gray levels or more. In order to satisfy these requirements with the above-mentioned area modulation method, a pixel must be configured by an 8×8 dot matrix, and a thermal head having a resolution of 32 dots/mm or higher is needed. Although a thermal head having a resolution of 16 dots/mm has been developed, it is difficult to realize one having a resolution of 32 dots/mm or higher. For this reason, in this area modulation method, requirements for the number of gray levels and resolution cannot be satisfied, and it is impossible to perform halftone printing having a gradation that in both smooth and fine.

In a halftone image printing device, a portion designated to remain white in a high or medium density region may be colored due to heat pile-up of the thermal head. In contrast to this, an ink may not be transferred due to an insufficient amount of heat in a low density region. For this reason, a halftone image cannot be printed precisely.

SUMMARY OF THE INVENTION

It is an object of the present invention to provide a halftone image printing device capable of printing a halftone image without degrading resolution.

According to the present invention, there is provided a halftone image printing device comprising thermal recording means for printing one pixel as a dot pattern constituted by predetermined printing dots in a dot matrix defined by dots arranged in main scanning and subscanning directions; and printing control means, connected to said thermal recording means, for determining which of a plurality of density ranges obtained by dividing an overall density range includes a density level of the pixel, for determining a dot pattern constituted by dots corresponding to the density range, a dot pattern in the lowest density range of the plurality of density ranges being constituted by a discrete printing dot, and other dot patterns of the plurality of density ranges including a dot pattern of a lower density range and printing dots connected to the dot pattern of the lower density range in at least one of the main scanning and subscanning directions, and for determining printing energy of each printing dot which constitutes the dot pattern in accordance with the density level of the pixel.

BRIEF DESCRIPTION OF THE DRAWINGS

FIGS. 2A to 2C are views showing the relationship between energy supplied to a printing head and the shape of a pixel formed to explain a principle of the first embodiment;

FIG. 3 is a graph showing the relationship between the energy supplied to the printing head in the first embodiment and an optical density of the pixel formed;

FIG. 6 is a table showing the relationship between the energy supplied to the printing head in the second embodiment and the halftone gradation level of the pixel formed;

FIG. 7 is a block diagram showing a multilevel dot pattern generator shown in detail in FIG. 1;

FIGS. 8A to 8H are timing charts showing an operation of the multilevel dot pattern generator shown in FIG. 7;

FIGS. 10A to 10G are timing charts showing an operation of the thermal head driver shown in FIG. 9;

FIGS. 13A and 13B are signal waveform charts showing an energy amount supplied to a head when the thermal head is at a normal temperature;

FIGS. 14A and 14B are signal waveform charts indicating that energy supplied to the thermal head at a high temperature can be decreased by decreasing a pulse width to compare with that at a normal temperature;

FIGS. 15A and 15B are signal waveform charts indicating that energy supplied to the thermal head at a high temperature can be decreased by decreasing an amplitude of a signal to compare with that at a normal temperature;

FIG. 21 is a table showing the relationship between energy supplied to a printing head used in the third embodiment and a halftone gradation level of the pixel formed;

FIGS. 23A to 23D are views showing dot patterns compared to indicate the effectiveness of a fourth embodiment;

FIGS. 24A to 24D are views showing multilevel dot patterns, in respective density ranges, used for driving a printing head in the fourth embodiment;

FIGS. 25A and 25B are views showing a pattern when a plurality of dot patterns are continuously arranged in comparison with a conventional dot pattern;

FIGS. 26A and 26B are views showing the shape of a pixel formed when the thermal head is driven using the patterns shown in FIGS. 25A and 25B;

FIG. 43 is a graph showing assignment of dot patterns in respective density ranges for preventing generation of random bridges according to a seventh embodiment of the present invention;

FIG. 44 is a view showing the relationship between halftone gradation levels of the pixel and levels of energy supplied to the printing head according to the seventh embodiment;

FIGS. 46A to 46I are views showing modifications of dot patterns according to the seventh embodiment seventh embodiment;

FIG. 47 is a view showing dot patterns according to an eighth embodiment of the present invention;

FIG. 48 is a view showing dot patterns according to a ninth embodiment of the present invention;

FIG. 49 is a view showing dot patterns according to a tenth embodiment of the present invention;

FIG. 50 is a view showing assignment of dot patterns in respective density ranges according to an eleventh embodiment of the present invention;

FIG. 51 is a graph showing an example of printing of one of the dot patterns according to the eleventh embodiment of the present invention;

FIG. 52 is a view showing the relationship between halftone gradation levels of the pixel and levels of energy supplied to the printing head according to the eleventh embodiment of the present invention;

DETAILED DESCRIPTION OF THE PREFERRED EMBODIMENTS

A halftone image printing device according to an embodiment of the present invention will be described with reference to the accompanying drawings.

A principle of the present invention will first be described. As described above, in a halftone image printing device, a pixel corresponds to m×n dots in a matrix form (a dot is the minimum unit of a heating member constituting a printing head and capable of transferring an ink). The density of each pixel corresponds to the total amount of ink transferred in a matrix dot region corresponding to each pixel. Only when the amount of heat from a head exceeds a certain threshold level is an ink transferred to paper; otherwise, no transfer is performed. Conventionally, energy supplied to a head is a constant value higher than the threshold level, and the amount of ink transferred per dot is constant, through control, irrespective of the heat pile-up of the head. However, the present invention is based on the fact that the degree of heat of each heating member is proportional to the area of the dot formed. Thus, a specific dot is selected irrespective of density, and energy supplied to the selected specific dot is changed in accordance with density so as to control the degree of heat generated by this dot, thereby changing the total amount of ink transferred per pixel in accordance with the density.

Figure 1:
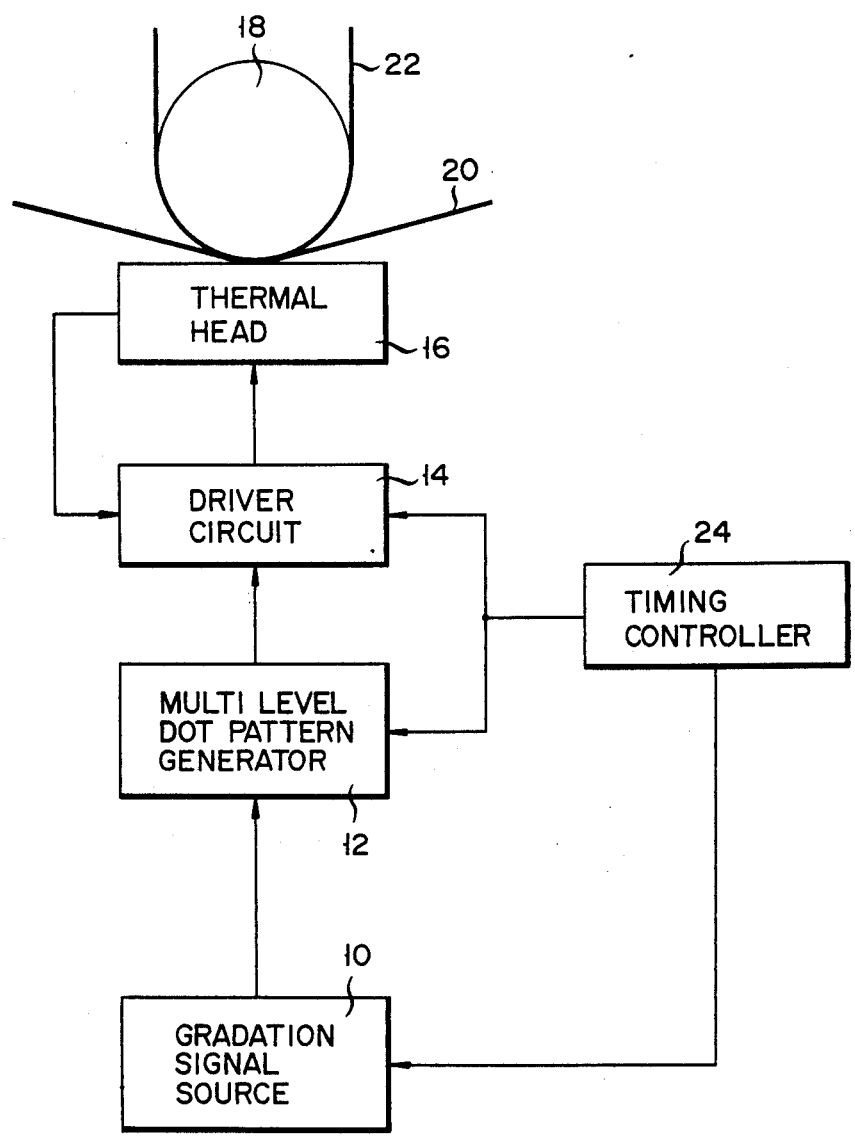
FIG. 1 is a block diagram showing a halftone image printing device apparatus according to a first embodiment of the present invention.

FIG. 1 is a block diagram showing an arrangement of a halftone image printing device according to a first embodiment of the present invention. An output from a gradation signal source 10 such as a memory is supplied to a multilevel dot pattern generator 12. Note that a gradation signal indicates the gray level of each pixel. The generator 12 generates a predetermined dot pattern for each pixel. Note that a pixel has an m×n dot matrix configuration, and a multilevel dot pattern constituted by specific dot therein is generated. That is, heating members corresponding to dots in this dot pattern are energized, the energization level (energy supply level) of each dot being controlled by the gradation signal. The thermal head 16 melts an ink while pressing printing paper 22 against the platen roller 18 through an ink ribbon 20, thereby transferring the ink onto the paper 22. A timing controller 24 for controlling various timings is connected to the gradation signal source 10, the multilevel dot pattern generator 12 and a driver circuit 14.

The operation of the first embodiment will be described. Note that, for the sake of simplicity, the generator 12 constitutes a pixel of a 3×3 dot matrix configuration, and generates a discrete dot pattern ("discrete" will be used as well as "single" hereinafter) of one dot at a central portion thereof. Energy supplied to each heating member is proportional to the amount of ink transferred to the printing paper. When a heating member of the head is energized at a low level, i.e., in the case of a low density level, a dot having a size corresponding to the heating member is formed on the printing paper, as shown in FIG. 2A. When the heating member of the head is energized at a medium level, i.e., in the case of a medium density level, a dot slightly larger than the size of the heating member is formed on the printing paper, as shown in FIG. 2B. When the heating member of the head is energized at a high level, i.e., in the case of a high density level, a dot considerably larger than the size of the heating member is formed on the printing paper, as shown in FIG. 2C.

For this reason, the energy supply level of the heating member and the optical density of a pixel can be controlled as shown in FIG. 3. When the energy supply level is smaller and lower than the threshold energy level required for the optimal transfer of ink, it is uncertain whether or not ink transfer has been performed. Therefore, since the optical density is also uncertain, a characteristic curve is indicated by a broken line.

According to the first embodiment, the energization level of the thermal head is determined in accordance with the gradation signal, and, as a result, a proper amount of ink corresponding to the density is transferred to the printing paper, thus printing each pixel in a halftone mode.

Note that in the first embodiment, only a discrete dot in 3×3 dots is used so as to provide halftone printing in accordance with a change in the energy supply level of the specific dot. However, a density may not satisfactorily be controlled by only the change in the energy supply level of the specific dot, and an embodiment solving this problem will be described hereinafter.

Figure 4A:
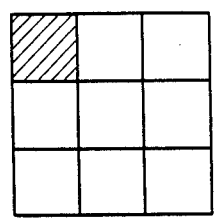
FIGS. 4A to 4C are views showing multilevel dot patterns, in respective density ranges, used for driving a printing head in a second embodiment.
Figure 4B:
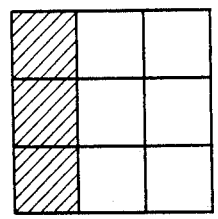
Figure 4C:
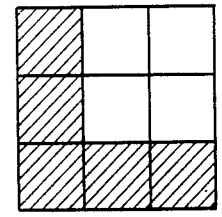
Figure 5:
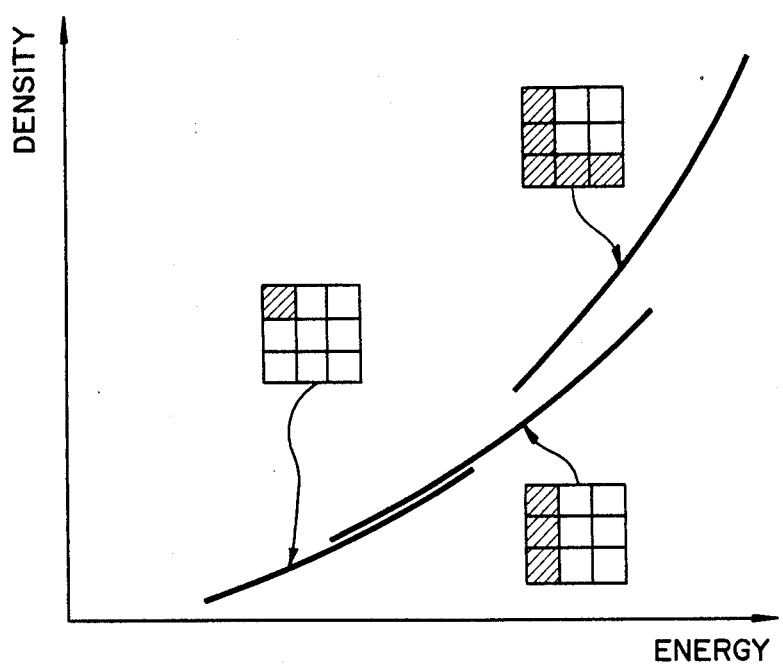
FIG. 5 is a graph showing the relationship between energy supplied and an optical density of a pixel formed when the printing head is driven in accordance with the multilevel dot patterns shown in FIGS. 4A to 4C.

In a second embodiment in which the above problem is solved, the total optical density range is divided into three ranges, with specific dot patterns being assigned to respective density ranges. A block diagram of the second embodiment is substantially the same as that of the first embodiment shown in FIG. 1, except that the generator 12 constitutes a pixel of a 3×3 dot matrix, and generates a dot pattern (discrete dot patter) constituted of one dot at an upper left corner, as shown in FIG. 4A, in a low density range; a dot pattern (stripe pattern) constituted by three dots included in a leftmost column, as shown in FIG. 4B, in a medium density range; and a dot pattern (L-shaped dot pattern) constituted by five L-shaped dots included, in a high density range, in the leftmost column of the lowermost row. Note that the vertical and lateral directions of each pattern correspond to a vertical movement and/or subscanning direction of the printing paper, and a lateral head heating member alignment and/or main scanning direction, respectively. The energy supply level of the heating member is varied in each pattern in accordance with a gradation signal, as in the first embodiment. In the low density range, the size (diameter) of a dot pattern transferred to the printing paper is changed in accordance with a change in the energy supply level of the heating member, thus also changing the density. In the medium density range, the size (width) of a stripe pattern transferred to the printing paper is changed in accordance with the change in the energy supply level of the heating member, thus also changing the density. In the high density range, an area of a 2×2 dot white portion other than an L-shape is changed in accordance with the change in the energy supply level of the heating member. In this case, the optical density ranges which can be indicated by changing the energy supply level of the heating member, partially overlap each other. A lower curve in FIG. 5 indicates characteristics of the discrete dot pattern of FIG. 4A, a middle curve in FIG. 5 indicates characteristics of the stripe pattern of FIG. 4B, and an upper curve in FIG. 5 indicates characteristics of the L-shaped pattern of FIG. 4C.

FIG. 6 shows an energy supply level of each dot corresponding to each halftone gradation level. In the second embodiment, the overall density is divided into 31 levels, the discrete dot pattern represents 0 to 4 halftone gradation levels (optical density), the stripe pattern represents 5 to 14 halftone gradation levels, and the L-shaped pattern represents 15 to 30 halftone gradation levels. In this manner, according to the second embodiment, a pixel of a 3×3 dot matrix can provide 31 levels. In a conventional area modulation methods such as a DITHER method, a pixel of a 3×3 dot matrix can provide only 10 levels. Therefore, the number of gradation levels can be greatly increased in the present invention.

Each dot pattern used in the second embodiment has the following advantages.

(1) The dot pattern including a stripe perpendicular to a dot array of the printing head (which is constituted by a heating member array aligned along a lateral direction of the printing paper) can print a smooth pattern. The predetermined dots are continuously energized, such that the gradient of heat-diffusion becomes steep and the edge of the printed pattern becomes stable.

(2) Since each dot pattern has a white portion of 2×2 dots or more, a portion to be whitened cannot be arbitrarily blackened, and stable gradation with less noise can be obtained. This performance was confirmed by a head having a resolution of up to 16 dots/mm.

(3) When an energy supply level is changed in the same dot pattern, the printing density increases linearly with respect to an increase in the average energy per dot. That is, the density can be controlled in an analog manner, If the number of control levels are enlarged, a large of gradation number can be obtained.

(4) In advantage (3), the higher the resolution of the printing head becomes, the weaker a pattern dependency becomes. Therefore, density characteristics cannot differ from their respective patterns. The energy supply level also increases linearly with respect to an optical density, even if the dot pattern is changed.

The second embodiment will be described in more detail hereinafter. Assume, for the sake of description, that a pixel has 3×3 dots. FIG. 7 is a block diagram showing the multilevel dot pattern generator 12 in detail. Gradation data (8 bits) from the gradation signal source 10 is supplied to a buffer (RAM1) 30 and a buffer (RAM2) 32. This is to complete data supply from the signal source 10 by one operation per line, If the gradation data is not supplied to buffers 30 and 32, since the gradation data only gives one level to a pixel of 3×3 dots, the same gradation data from the signal source 10 must be supplied three times per every line. The buffers RAM1 and RAM2 have a capacity of 8 bits×854. Note that the printing head is a 2,560-dot head having 2,560 heating members aligned along the main scanning direction (since the printing paper is moved along the vertical direction in this case, the main scanning direction corresponds to the lateral direction of the paper). Since a pixel has 3×3 dots, bits of the smallest integer larger than 2,560/3, i.e., 854 bits are required. The two buffers 30 and 32 allow for high speed printing. Data in the first line (three lines in practice, because a pixel has 3×3 dots) is written into the buffer RAM1, and the data in the next line is written into the buffer RAM2. Data in the following lines are alternately written into the buffers RAM1 and RAM2. Thus, while data is written into one buffer, data can be read out from the other buffer. When data write of one line data in the buffer RAM1 or RAM2 is completed, the buffer RAM1 or RAM2 is set in a standby state. When printing of 3 line data constituting a pixel is completed, a data readout signal RAM1RD or RAM2RD is generated, and the data at the second line is read out from the buffer RAM1 or RAM2. Thereafter, this operation is repeated until printing for one page is completed (in the case of color printing, until printing for one color is completed). Assuming that a printing cycle is 2 msec/line, it requires 6 msec to read out data of one pixel line.

The same dot pattern is generated three times from the buffers RAM1 and RAM2. In response to the signal RAM1RD, data in the buffer RAM1 is read out, and the readout data is supplied to a multilevel dot pattern generator ROM 34. (The generator 34 can comprise a RAM.) Multilevel do pattern data (6 bits) in the ROM 34, indicated by the input data, an out put from a line counter 36 (2 bits) and an output from a heating dot counter 38 is serially generated, and is stored in a buffer (RAMB1) 40 and a buffer (RAMB2) 42. This data indicates the energy supplied to each heating member of the printing head. The counters 36 and 38 repeatedly generate data "0", "1", and "2", indicating which data is to be read out from the 3×3 dot matrix. The buffer (RAMB1) 40 and the buffer (RAMB2) 42 have a capacity of 6 bits×2,560, and are provided for two lines for the purpose of high speed driving. Data for one line (854 words) is read out from the RAM1, and is converted into dot pattern data indicating an energization energy level. When all the data (2,560 words) are written in the RAMB1, the RAMB1 is switched to the standby state. During this operation, data is read out from the other RAMB2 so as to perform on line printing.

FIGS. 8A to 8H show the above operation as a timing chart.

Figure 9:
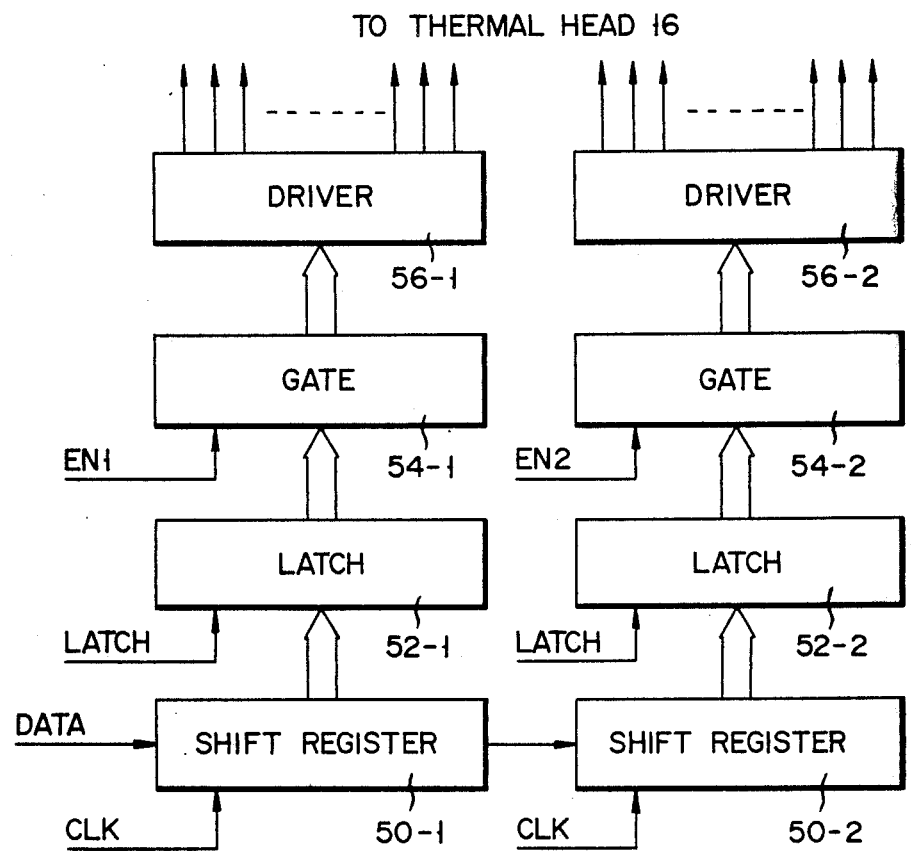
FIG. 9 is a block diagram showing a thermal head driver shown in FIG. 1.

FIG. 9 is a detailed block diagram of the driver 14 shown in FIG. 1. It should be noted that a thermal head 16 is driven by two phases, and has two identical circuits with suffix numbers 1 and 2. The data supplied from the generator 12 is supplied to a shift register 50-1, and the output from the register 50-1 is transferred to a shift register 50-2. The same clock signal is supplied to the registers 50-1 and 50-2. The outputs from the registers 50-1 and 50-2 are supplied to latches 52-1 and 52-2 in parallel. The latches 52-1 and 52-2 receive a common latch signal. The outputs from the latches 52-1 and 52-2 are supplied to gates 54-1 and 54-2, respectively. The gates 54-1 and 54-2 receive enable signals EN1 and EN2, respectively. The outputs from the gates 54-1 and 54-2 are supplied to the heating members in respective phases of the thermal head through drivers 56-1 and 56-2.

FIGS. 10A to 10G are timing charts showing the operation of this circuit. When 2,560 bit data is serially transferred six times within 2 msec, the transfer rate is about 8 Mbits/sec. On the other hand, a thermal head drive IC normally has a transfer rate of about 4 Mbits/sec. Therefore, parallel data input ports must be provided to the thermal head for high speed data transfer. In this embodiment, the thermal head has eight inputs. Therefore, data transfer of 2,560/8=320 bits is performed.

Figure 11:
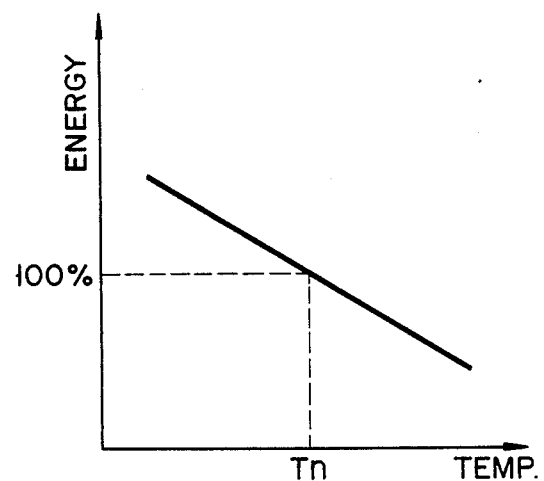
FIG. 11 is a graph showing the relationship between energy supplied to a thermal head and a temperature thereof.
Figure 12:
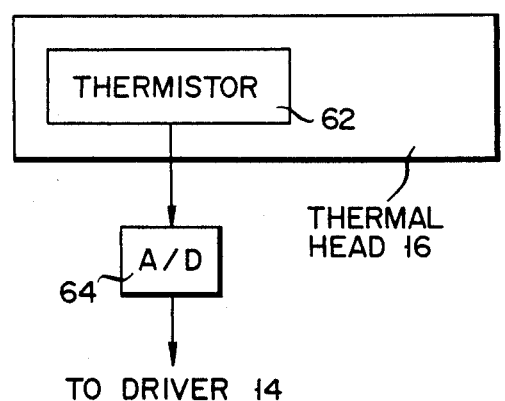
FIG. 12 is a block diagram showing a thermal head shown in detail in FIG. 1.

In this embodiment, as shown in FIG. 1, heat from the thermal head 16 is detected, and the detection data is fed back to the driver circuit 14. Since an ink amount differs depending upon the temperature of the head 16, even at the same energy level, the energy level must be controlled by heat from the head 16. For this reason, assuming that, as shown in FIG. 11, the energy level at a normal temperature (Tn) is 100%, the energy level is decreased as temperature increases. Therefore, even if the temperature is changed, a constant amount of ink can be transferred. In this embodiment, as shown in FIG. 12, the head 16 is connected to a thermistor 62, and the output therefrom is supplied to the driver 14 through an A/D converter 64.

The driver 14 exerts control, in accordance with the detected temperature value, in the following manner. As shown in FIGS. 9 and 10, energy supplied to the head 16 is controlled by the gates 54-1 and 54-2. For this reason, pulse widths of the enable signals EN1 and EN2 shown in FIGS. 13A and 13B and supplied to the gates 54-1 and 54-2, are decreased as shown in FIGS. 14A and 14B, respectively, thus serving to reduce the energy requirements. Alternatively, as shown in FIGS. 15A and 15B, when amplitudes of the output voltages from the drivers 56-1 and 56-2 are decreased, this too can decrease the energy requirements.

Figure 16A:
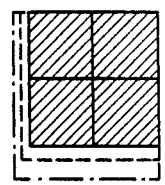
FIGS. 16A to 16C are views showing the effectiveness of a dot pattern used in a third embodiment.
Figure 16B:
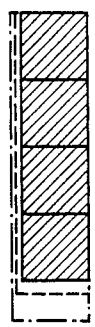
Figure 16C:
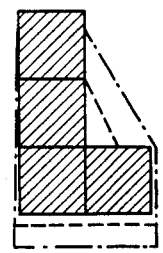

Another embodiment will be described in which selection of a dot pattern in each density range is altered. In a third embodiment, a dot pattern comprising a combination of L-shaped dot patterns is used in every density range. Effectiveness of the L-shaped pattern will be explained with reference to FIGS. 16A to 16C. FIG. 16A shows a concentrated pattern used in a DITHER method, FIG. 16B shows a stripe pattern and FIG. 16C shows the L-shaped pattern according to the third embodiment. Each pattern has 4 dots. Broken lines and alternate long and short dashed lines respectively indicate the sizes of pixels formed when these patterns are energized so as to transfer an ink. Note that the alternate long and short dashed lines indicate cases having higher energy. In general, in high-speed thermal transfer printing, a pixel slightly expanded along the subscanning direction (the direction in which the printing paper moves; the vertical implied in the figure) is apt to be formed. Therefore, a pixel is expanded in accordance with the number of dots along the subscanning direction. In other words, if the same amount of energy is supplied, the dynamic range of gradation is widened. In addition, since a dot generally has a regular rectangular shape and is of a small matrix size, e.g., the concentrated pattern shown in FIG. 16A, a bridge is formed between two adjacent dots when the energy level is increased, resulting in degradation in smoothness due to uneven density, and in image quality due to noise caused by the random generation of bridges. In contrast, in the L-shaped pattern shown in FIG. 16C, since the pixel is expanded within a region surrounded by dot arrays along the main scanning and subscanning directions, a wider dynamic range of gradation can be obtained as compared to the patterns shown in FIGS. 16A and 16B. This result is more notable in a pattern comprising a combination of L-shaped patterns than in a single L-shaped pattern.

Figure 17A:
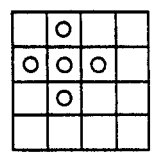
FIGS. 17A to 17F are views showing a dot pattern used in the third embodiment and the shape of a pixel formed thereby.
Figure 17C:
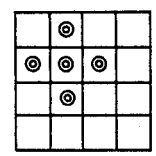
Figure 17E:
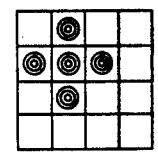
Figure 17B:
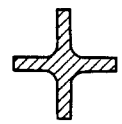
Figure 17D:
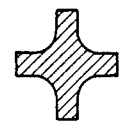
Figure 17F:

FIGS. 17A to 17F show the sizes of pixels when cross-shaped patterns, as a combination of L-shaped patterns arranged in a 4×4 dot matrix, and high, medium and low levels of energy are supplied to dots. FIG. 17A shows a case wherein low level energy is supplied to the dots, and FIG. 17B shows the resultant size of a pixel. FIG. 17C shows a case wherein medium level energy is supplied to the dots, and FIG. 17D shows the resultant size of a pixel. FIG. 17E shows a case wherein high level energy is supplied to the dots, and FIG. 17F shows the resultant size of a pixel. In this manner, since the cross-shaped pattern includes four regions surrounded by dot arrays along the main and subscanning directions, the dynamic range of gradation can be widened.

Figure 18A:
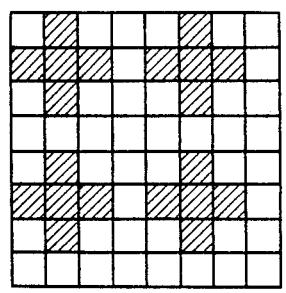
FIGS. 18A and 18B are views showing a pattern and the shape of continuous pixels when a plurality of dot patterns used in the third embodiment are continuously arranged.
Figure 18B:
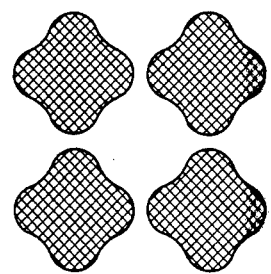

In the third embodiment, it is considered that adjacent patterns should have less, and preferably no dots contacting each other when each pattern is selected. When there are no dots contacting each other between two adjacent patterns, the following effect can be obtained. As shown in FIG. 18A, cross-shaped patterns having five dots are arranged in four adjacent 4×4 dot matrices. These patterns have not dots contacting each other. FIG. 18B shows a case wherein an ink is transferred using these patterns. Since the patterns are spaced apart from each other, even if the energy level is changed, the respective patterns are kept separate. As the energy level is increased, the pixels are enlarged. However, since non-energized dots are present between adjacent patterns, attachment of an ink and ink transfer to the printing paper are unlikely to occur at such non-energized dots when peeling of the ink ribbon from the printing paper. Thus, independency of the patterns can be maintained. In this case, since the narrowest portions of the cross-shaped patterns are adjacent to each other, they serve to maintain the independency of the patterns. Even if the respective patterns contact each other, when the narrowest portions of the patterns contact each other, the center of the cross-shaped pattern is furthest from the contacting portion. Thus, pixels are expanded from the center of the dot matrix in accordance with the energy level, and non-transferred ink portions are concentrically contracted. Thus, if the energy level is increased, a satisfactory image quality can be maintained. In general, when adjacent patterns contact each other, an increase in the ink transfer area is observed in the contacting portion in accordance with pixel forming energy, this increase occurring abruptly. For this reason, linearity of gradation in accordance with an increase in pixel forming energy is often impaired.

Figure 19A:
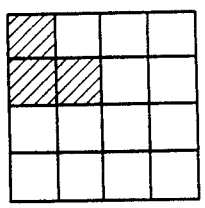
FIGS. 19A to 19N are views showing examples of dot patterns used in the third embodiment.
Figure 19B:
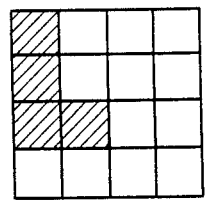
Figure 19C:
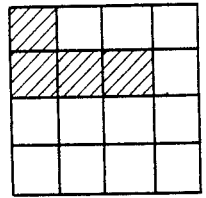
Figure 19D:
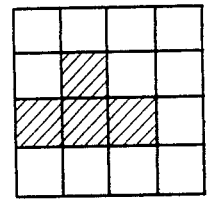
Figure 19E:
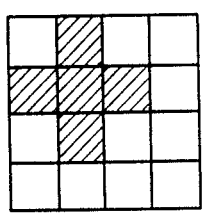
Figure 19F:
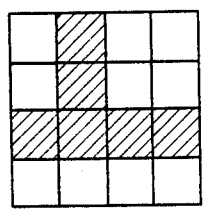
Figure 19G:
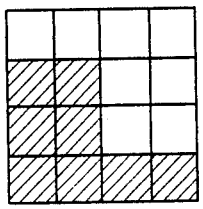
Figure 19H:
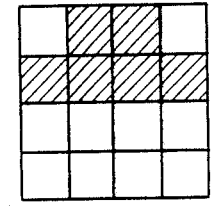
Figure 19I:
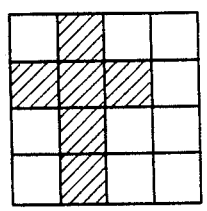
Figure 19J:
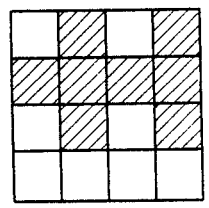
Figure 19K:
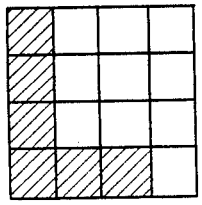
Figure 19L:
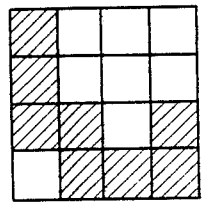
Figure 19M:
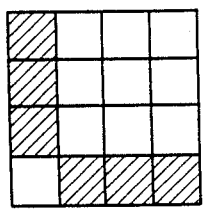
Figure 19N:
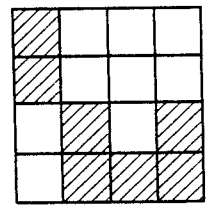
Figure 20:
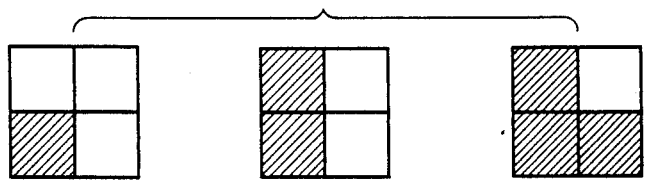
FIG. 20 is a view showing a dot pattern of the third embodiment when a pixel has a 2×2 matrix size.

FIGS. 19A to 19N show examples of dot patterns used in the third embodiment in the order from lower gradation levels to higher gradation levels. Note that although each pattern has 4×4 dots, it need to have 2×2 dots or more. However, in order to print a halftone image at high resolution, m and n of an m×n matrix size satisfy, preferably $2 \leq m \leq n \leq 6$. FIG. 20 shows patterns when $m=n=2$.

Figure 21:
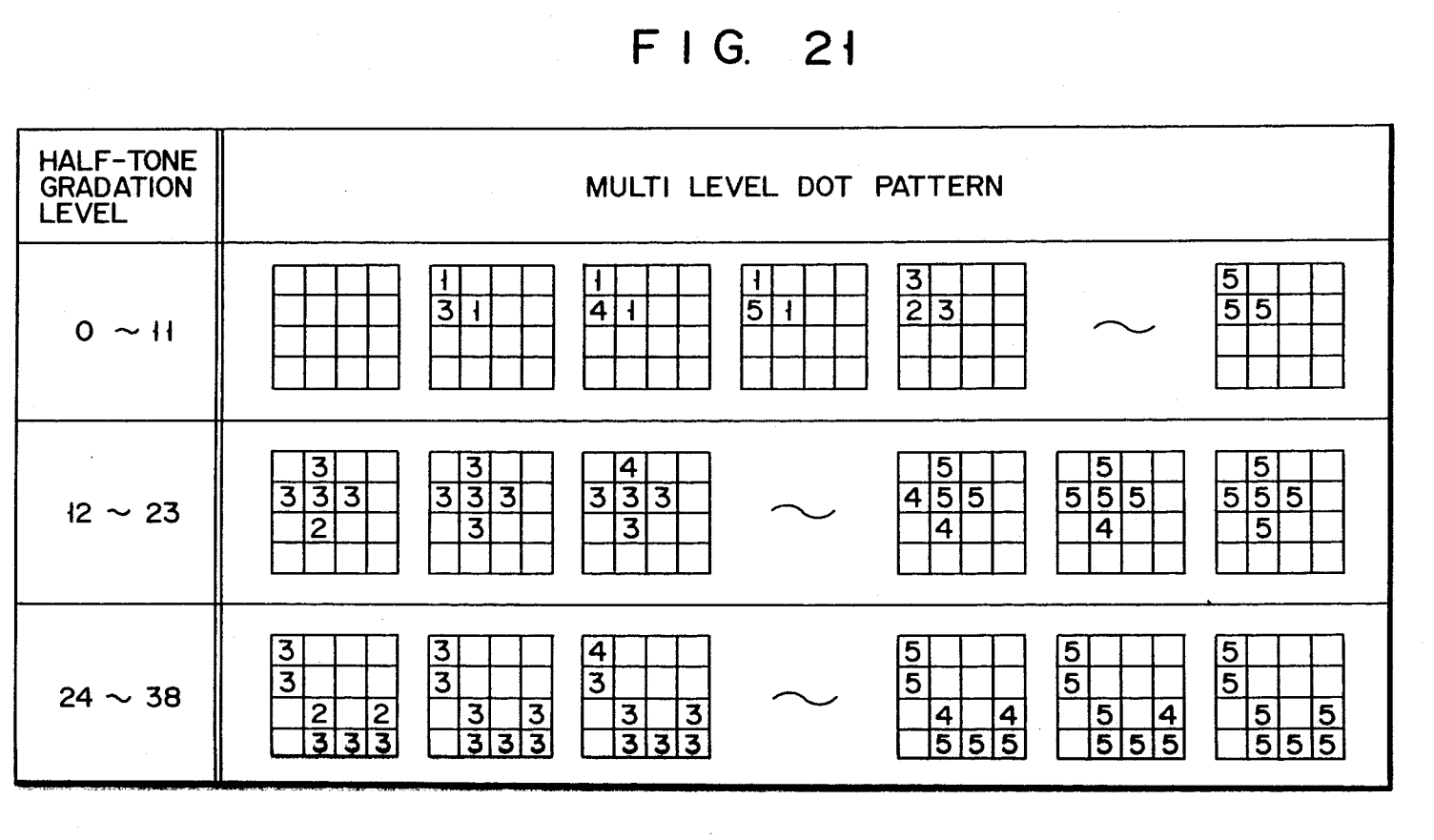

FIG. 21 shows halftone gradation levels of the third embodiment and energy supply levels for dots of dot patterns. In this case, the L-shaped pattern shown in FIG. 19A is assigned to the low density range, the cross-shaped pattern shown in FIG. 19E is assigned to the middle density range and the combined L-shaped pattern shown in FIG. 19L is assigned to the high density range, thereby providing 39 levels.

Figure 22:
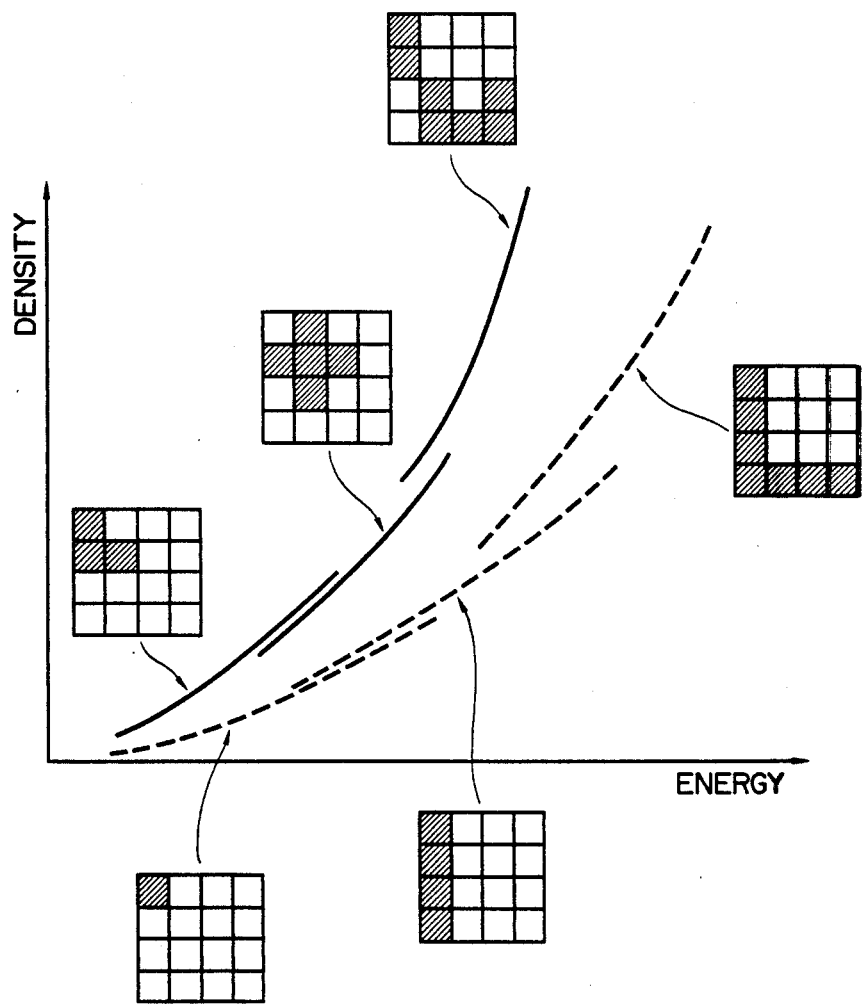
FIG. 22 is a graph showing the relationship between energy supplied and an optical density of a pixel formed when the printing head is driven using the multilevel dot pattern of the third embodiment.
Figure 27A:
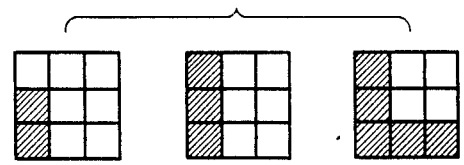
FIGS. 27A to 27D are views showing another example of multilevel dot patterns, in respective density ranges, used for driving the printing head in the fourth embodiment.
Figure 27B:
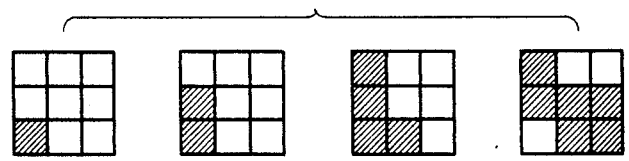
Figure 27C:
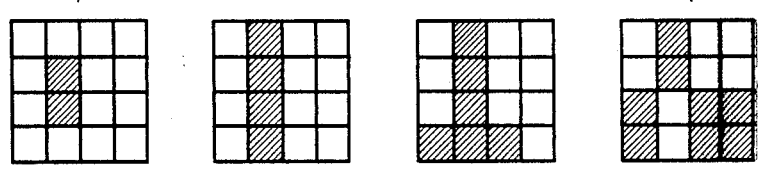
Figure 27D:
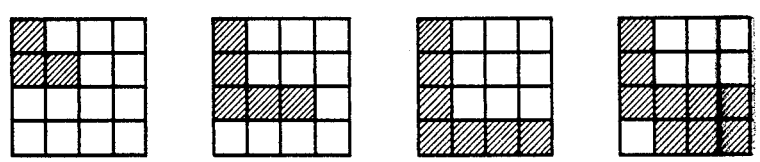
Figure 28A:
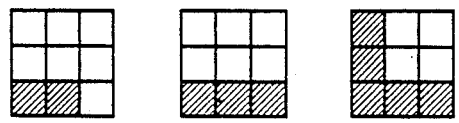
FIGS. 28A to 28D are views showing still another example of multilevel dot patterns, in respective density ranges, used for driving the printing head in the fourth embodiment.
Figure 28B:
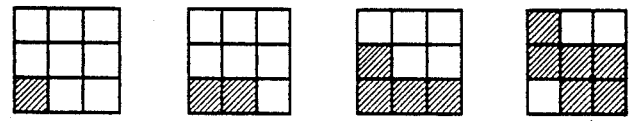
Figure 28C:
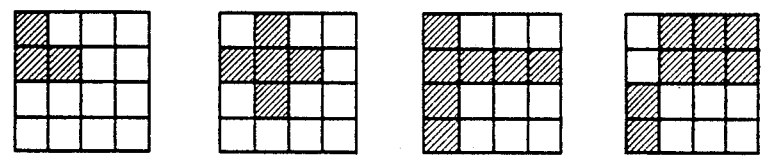
Figure 28D:
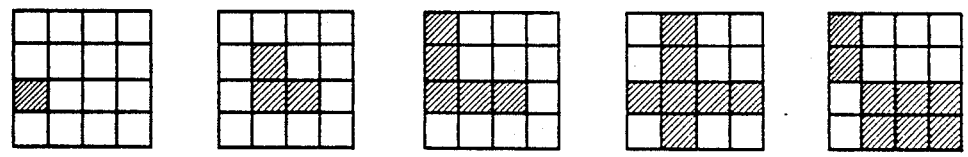
Figure 29A:
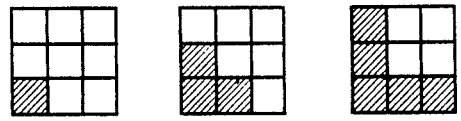
FIGS. 29A to 29D are views showing still another example of multilevel dot patterns, in respective density ranges, used for driving the printing head in the fourth embodiment.
Figure 29B:
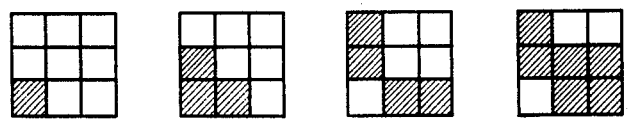
Figure 29C:
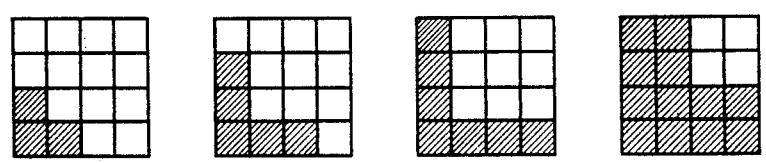
Figure 29D:
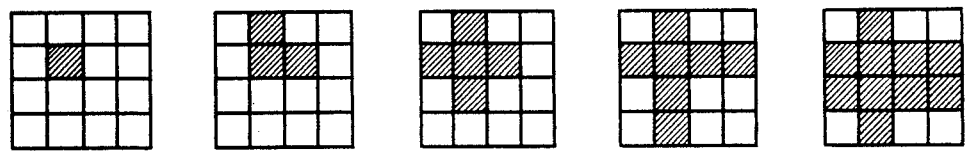

FIG. 22 is a graph for comparing the density characteristics of the multilevel pixels printed in the third embodiment and another previous embodiment (second embodiment). The characteristics of the third embodiment are indicated by the solid curve, and those of the other embodiment are indicated by the broken curve. In the third embodiment, as can be seen from this graph, the dynamic range of gradation can be widened, and a change in density can be obtained with good linearity. In addition, good image quality with no density irregularity can be obtained in the overall density range.

A fourth embodiment will be described hereinafter. In the fourth embodiment, dot patterns in each dot range are selected so that position of the dot arrays forming each dot pattern are the same (or in the same phase). That is, the pattern is determined so that the dot array forming the pattern is located at the same position in at least one of the main and subscanning direction. This is because pixels can be stably formed since the heat pile-up of the dot can be effectively utilized, and, in each pattern, the dynamic range of gradation is wide and linearity is high.

The patterns of the fourth embodiment will be described with reference to FIG. 23A to 23D, and FIG. 24A to 24D for the purpose of comparison with conventional patterns. FIGS. 23A to 23D, show the conventional patterns. FIGS. 24A to 24D show the dot patterns of the fourth embodiment. In this case, the overall density range is divided into four ranges. FIG. 25A is a view showing a dot pattern in which the conventional patterns shown in FIGS. 23A to 23D are continuously formed. FIG. 25B is a view showing a dot pattern in which the dot patterns of the fourth embodiment shown in FIGS. 24A to 24D are continuously formed. As shown in FIGS. 23A to 23D, when positions of the crossing points of the dot arrays in the patterns are different from each other, and when different patterns are formed adjacent to each other as shown in FIG. 25A, each dot may either make contact with the adjacent dot array, or be greatly separated therefrom. Therefore, the printing state becomes that as shown in FIG. 26A. In this state, printed and blank portions are aligned irregularly, and image quality is degraded by unstable gradation production caused by nose due to uneven density or a bridge irregularly generated between dot arrays of adjacent pixels. In contrast to this, according to the fourth embodiment, as indicated by broken lines in FIGS. 24A to 24D, since the phases of dot arrays in all the patterns coincide with each other in the main scanning and subscanning directions, heating centers also coincide with each other. As shown in FIG. 25B, even when different patterns are formed adjacent to each other, all the dot arrays can be regularly aligned. For this reason, since the printed and blank portions are aligned regularly in the printed state shown in FIG. 26B, image quality will not be degraded by unstable gradation reproduction caused by noise due to uneven density or a bridge irregularly generated between dot arrays of adjacent pixels. Therefore, the gradation reproduction characteristics can be greatly improved. When pixels are regularly aligned in a matrix form on the overall printing screen and the gradation reproduction characteristics are good even in a portion in which different patterns are formed adjacent to each other, high image quality printing can be achieved with less noise as compared to a conventional method.

FIGS. 27A to 27D, FIGS. 28A to 28D and FIGS. 29A to 29D show various examples of the dot pattern of the fourth embodiment. These figures show combinations of patterns in the respective density ranges. In FIGS. 27A to 27D, positions of dot arrays coincide with each other along the main scanning direction (lateral direction in figures). In FIGS. 28A to 28D, positions of the dot arrays coincide with each other along the subscanning direction (vertical direction in figures). In FIGS. 29A to 29D, the positions of the dot arrays coincide along both the main scanning and subscanning directions.

In the case of a discrete dot pattern constituting a single dot, although a dot position can be arbitrary, if such a discrete dot is regarded as a dot array and is aligned along an extending line of a dot array in another pattern, a better effect is obtained.

Figure 30:
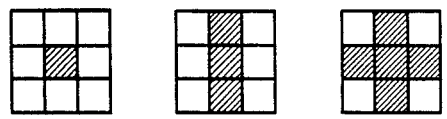
FIG. 30 is a view showing multilevel dot patterns used for driving a printing head in a fifth embodiment.
Figure 31:
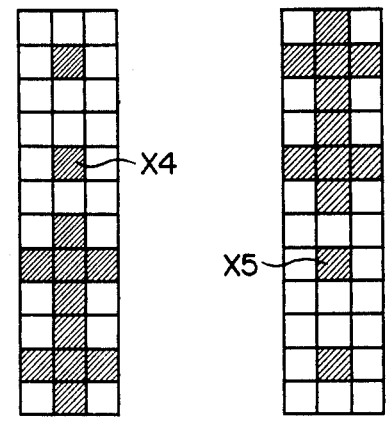
FIG. 31 is a view showing the shape of a pixel formed by driving the thermal head using the dot patterns shown in FIG. 30.
Figure 32:
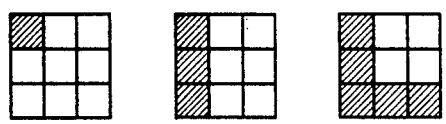
FIG. 32 is a view showing multilevel dot patterns compared to indicate the effectiveness of the fifth embodiment.
Figure 33:
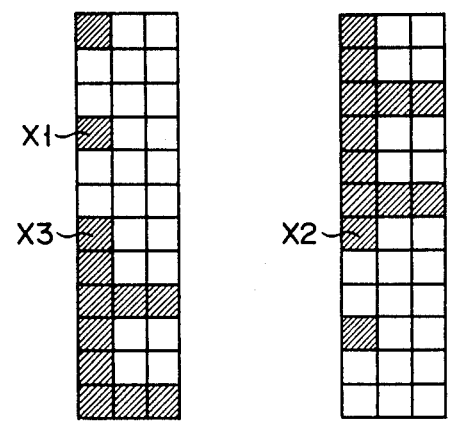
FIG. 33 is a view showing the shape of a pixel formed by driving the thermal head using the dot patterns shown in FIG. 32.

A fifth embodiment will be described hereinafter. In the fifth embodiment, as shown in FIG. 30, the heating center of each pixel coincides with the center of a dot matrix, and the dot pattern is established so as to be rotation symmetrical (of 180 degrees) about the center of the dot matrix. Each pixel has a 3×3 dot matrix configuration. A discrete dot pattern having only a central dot is assigned to the low density range, as shown at the left side of FIG. 30. A stripe dot pattern having 3 dots included in the center line is assigned to the middle density range, as shown in the central portion of FIG. 30. A cross-shaped dot pattern having 5 dots included in central vertical and lateral arrays is assigned to the high density range, as shown at the right of FIG. 30. With these patterns, as shown in FIG. 31, when the gradation patterns are switched from a high to a low level or vice versa, the dot pattern nearest the switched pattern remains the same. In contrast, in the case of the use of the non-symmetrical pattern of rotation shown in FIG. 32, when the gradation patterns are switched from a high to a low level or vice versa, the dot pattern nearest the switched pattern changes, as shown in FIG. 33. In the case of FIG. 33, the dot X2 does not have the cooling interval of a blank dot; consequently the dot X2 is printed as a large dot due to a heat pile up and has a size different from the dot X1 which has a cooling interval. Furthermore, since the dot X3 has a sufficient cooling interval, it is printed as a small dot. In the case of the figure to the left in FIG. 33, the density at a boundary becomes lower than a predetermined density, and, in the case of the figure to the right, the density at a boundary becomes higher than the predetermined density, i.e., exhibits a kind of edge emphasis characteristic resulting in discontinuity in the density. In contrast to this, in the case of FIG. 31, since dots X4 and X5 have the cooling interval of blank dots, they can be printed as dots having substantially the same size.

Figure 34:
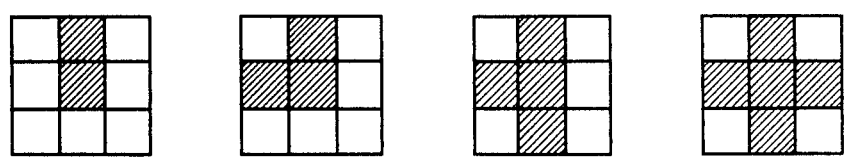
FIG. 34 is a view showing another example of multilevel dot patterns, in respective density ranges, used for driving the printing head in the fifth embodiment.
Figure 35:
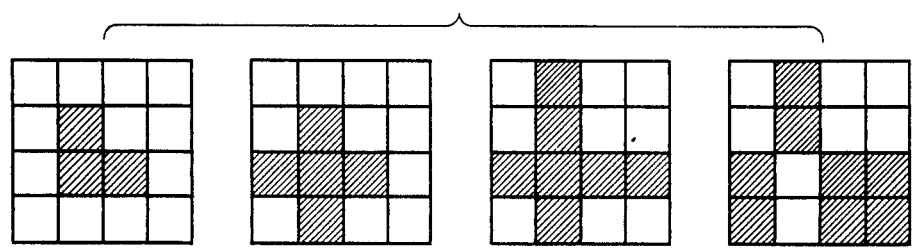
FIG. 35 is a view showing still another example of multilevel dot patterns, in respective density ranges, used for driving the printing head in the fifth embodiment.

FIGS. 34 and 35 are modifications of the dot patterns of the fifth embodiment.

Figure 36:
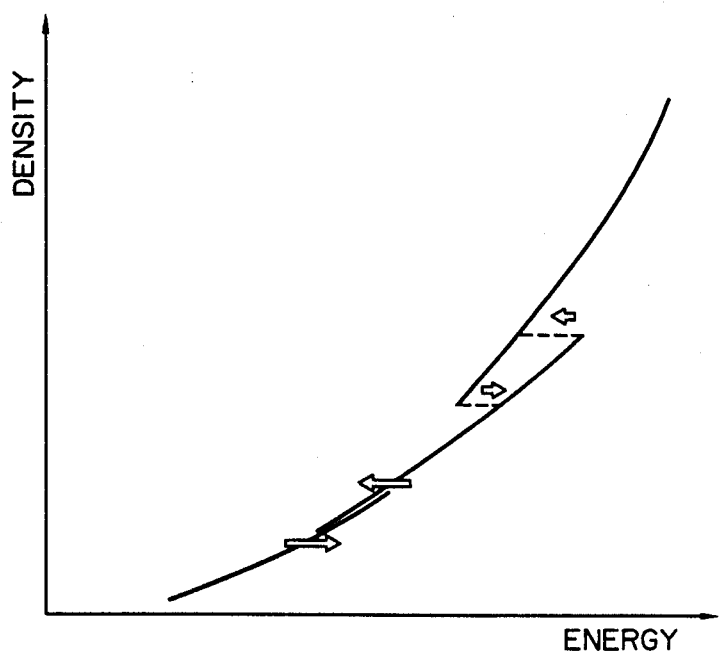
FIG. 36 is a graph showing characteristics of multilevel dot patterns, in respective density ranges, used for driving a printing head in a sixth embodiment.

A sixth embodiment will be described hereinafter. In this embodiment, as shown in FIG. 36, density ranges which are covered by respective dot patterns overlap, and the density level at which the dot patterns are switched are different in accordance with whether the density changes from a high to a low level or vice versa. In general, in the second to fifth embodiments, the dot patterns are selected in accordance with the density level and noise tends to be generated when the dot patterns are switched. For this reason, when the printing density is changed, the switching frequency of the dot patterns is preferably decreased as low as possible. In this embodiment, a changing direction of the density is detected, and when the density is changed from a high to a low level, a dot pattern which covers the high density range of the overlapping dot patterns is used. In contact to this, when the density is changed from a low to a high level, a dot pattern which covers the low density range of the overlapping dot patterns is used. Thus, the switching frequency of the dot patterns can be reduced.

Figure 37:
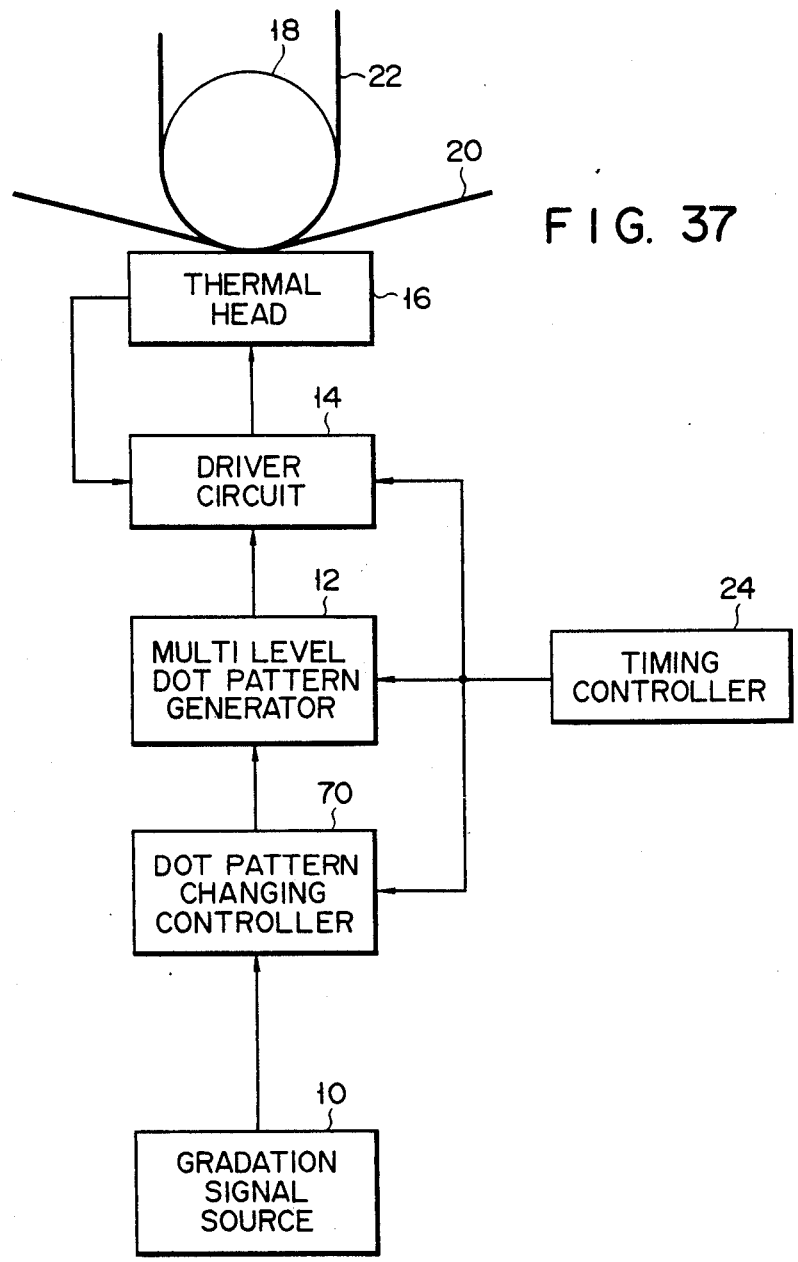
FIG. 37 is a block diagram showing an arrangement of the sixth embodiment.
Figure 38:
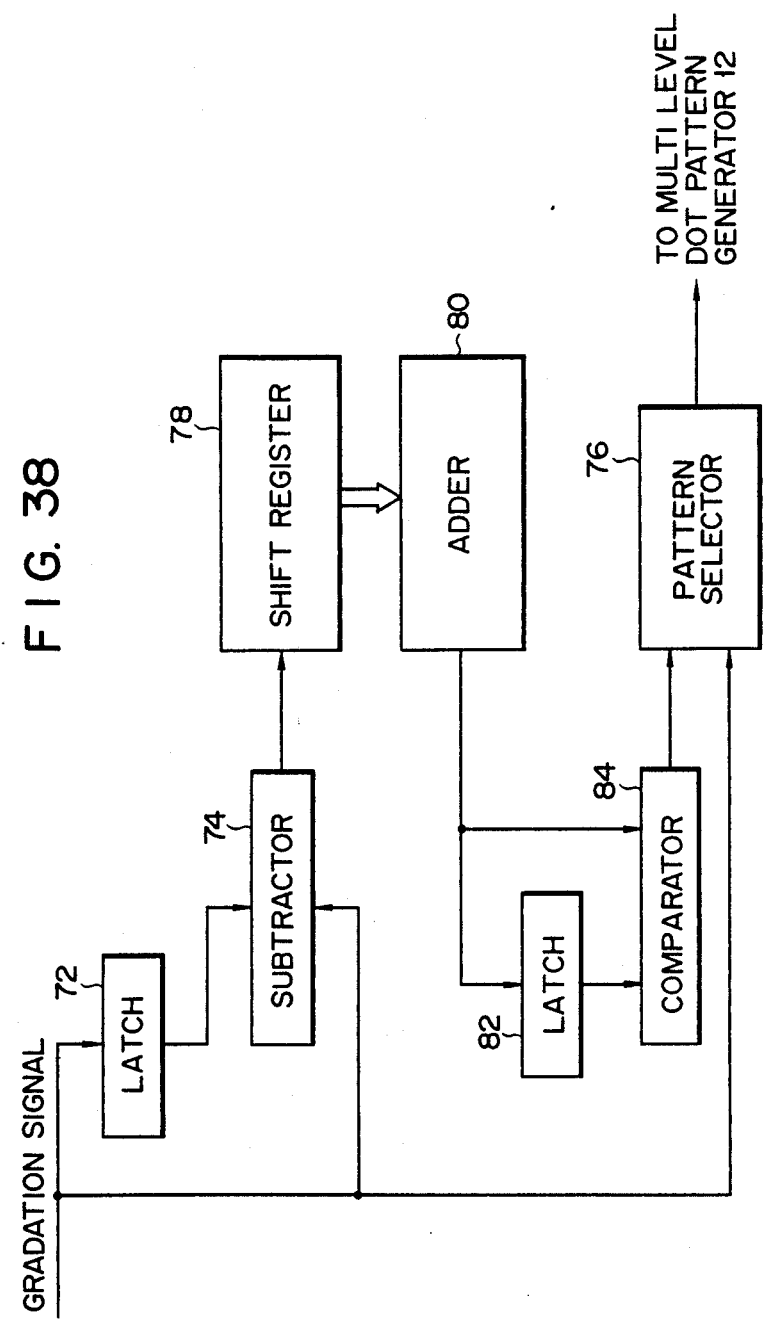
FIG. 38 is a block diagram showing a dot pattern changing controller of the sixth embodiment.
Figure 39:
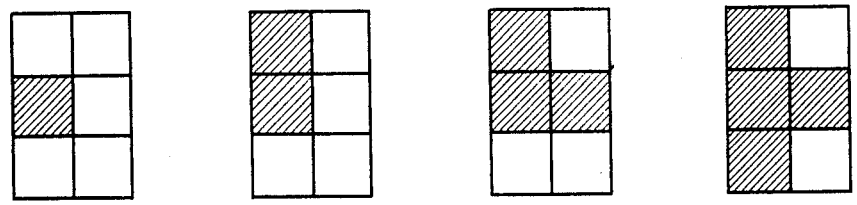
FIG. 39 is a view showing dot patterns when a pixel has a 2×3 dot matrix size.
Figure 40:
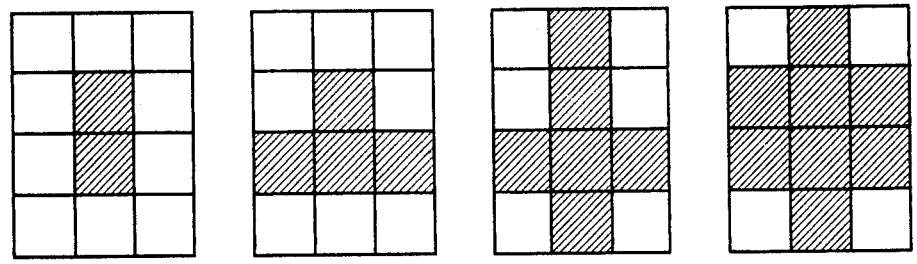
FIG. 40 is a showing dot patterns when a pixel has a 3×4 dot matrix size.
Figure 41:
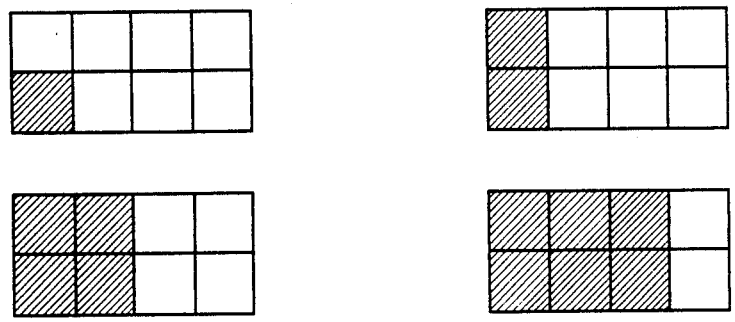
FIG. 41 is a view showing dot patterns when a pixel has a 4×2 dot mtrix size.

FIG. 37 shows a block diagram of the sixth embodiment. This block diagram is substantially the same as that of FIG. 1 except that a dot pattern changing controller 70 is connected between the gradation signal source 10 and the multilevel dot pattern generator 12. FIG. 38 shows the controller 70 in more detail. The gradation signal from the signal source 10 is supplied to a latch 72 and to a first input terminal of a subtractor 74 and a pattern selector 76. The output from the latch 72 is supplied to a second input terminal of the subtractor 74. The subtractor 74 subtracts the output signal from the latch 72 from the signal from the signal source 10, and supplies the subtraction result to a shift register 78. The register 78 delays an input image signal for every pixel, and outputs from the respective stages are supplied to an adder 80. The output signal from the adder 80 is supplied to a latch 82, and is also supplied to a first input terminal of a comparator 84. The output from the latch 82 is supplied to a second input terminal of the comparator 84. The output from the comparator 84 is supplied to the pattern selector 76, and the output from the selector 76 is supplied to the generator 12.

With this circuit, a pixel signal delayed by one pixel by the latch 72 is subtracted from the signal from the signal source 10, and a change in density for each pixel can be detected. In order to detect a density change in the main scanning direction at equal intervals, an average value of a change in density between m pixels (m corresponds to the number of stages of the register 78) is obtained. The average value is stored in the latch 78 every m pixels, and a change in the average values is detected to be either positive or negative by the comparator 84. The output from the comparator 84 and the input gradation signal are supplied to the selector 76, and the selector 76 supplies a selection signal to the generator 12 so as to select a halftone dot pattern included in the characteristics of the low density side of two overlapping characteristics when the change in density is positive. When the change in density is negative, the selector 76 supplies a selection signal to the generator 12 so as to select a halftone dot pattern included in characteristics at the high density side.

Examples of dot patterns for preventing generation of undesired printing patterns, i.e., uncontrollable random ink bridges, caused by random contact between the ink in adjacent dots or pixels, will be described below. Examples of bridges will be described with reference to FIGS. 42A and 42B.

Figure 42A:
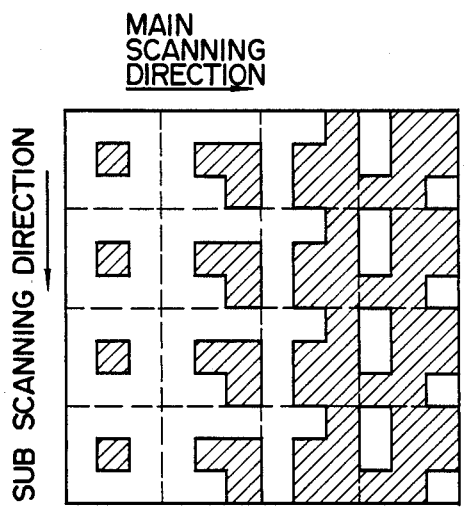
FIGS. 42A and 42B are views showing examples of random ink bridges due to arbitrary dot patterns.
Figure 42B:
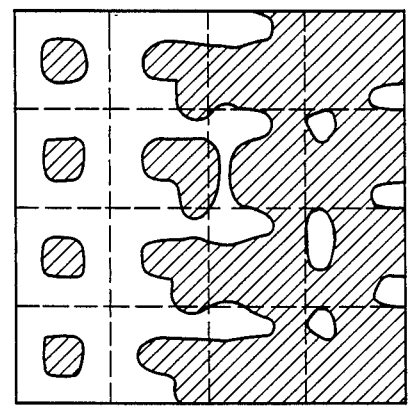

FIG. 42A shows dot patterns in which adjacent pixels in a main scanning direction all have different density levels (different dot patterns), and adjacent pixels in a subscanning direction have the same dot pattern. FIG. 42B shows an example of the type of printing produced by these dot patterns. In this case, assume that main scanning is performed from the left-to-right and subscanning is performed from top-to-bottom, in FIG. 42A. When different dot patterns are adjacent to each other in the main scanning direction, as described above, black portions tend to extend (become elongated) along the main scanning direction due to a build-up of heat in the thermal head and the like, and undesirably blacken white portions. This blackened portion is known as a bridge. Bridges are generated at random and hence cannot be controlled. When bridges are generated, their density levels increase considerably and degrade the linearity of control signal vs. density, with the result that smooth gradation characteristics cannot be maintained.

FIG. 43 is a graph showing the assignment of dot patterns in respective density ranges according to a seventh embodiment of the present invention. In FIG. 43, the abscissa represents the amount of energy supplied to the printing head for printing one pixel, and the energy amount is determined in accordance with drive pulse widths, drive pulse amplitudes, and a combination thereof in the case of thermal printing.

In this embodiment, one pixel is constituted by a 3×3=9 dots matrix, and its center dot P is set to be a reference dot, as is shown in pattern a0. An overall density range from the lowest to highest ranges is divided into four, i.e., I, II, III, and IV density ranges, as is shown in FIG. 43, and dot patterns a1, a2, a3, and a4 are respectively assigned to ranges I, II, III, and IV. In the case of a density level overlapping two density ranges, a dot pattern of either of the two ranges is adopted. Reference symbol a1 denotes a dot pattern wherein one dot is printed at the center of a matrix (the reference dot); a2, an L-shaped dot pattern wherein three dots are printed at the reference dot position of the matrix and at positions above and to the right of the reference dot position, so that the corner of the shape L is located at the reference dot position; a3, a cross-shaped dot pattern wherein five dots are printed at the reference dot position of the matrix and at positions above, below, and to the left and right of the reference dot position, so that the crossing point is located at the reference dot position; and a4, a dot pattern wherein six dots are printed at the reference dot position and at positions above, below, and to the left, right, and upper right of the reference position.

The main characteristic of all these patterns is that the dot which constitutes pattern a1 is included in the other patterns, i.e. a2, a3, and a4, the dots constituting pattern a2 are included in patterns a3 and a4, and the dots constituting pattern a3 are included in pattern a4. As has been described above, each dot pattern according to the seventh embodiment is produced by adding dots to the dot pattern at the lower density level, so as to extend a part thereof, and dots are added along the main scanning direction and the subscanning direction, these two directions having priority over all other directions, i.e., diagonal directions. If non-energized dots are present in the main scanning and subscanning directions, as shown in patterns a1 and a2, dots are added in these directions. For this reason, printing dots tend to be concentrated on main scanning and subscanning arrays, so that bridges are always generated at portions where they are supposed to be generated, and no random bridge is generated.

FIG. 44 shows examples of 37 halftone gradation levels represented by the above four dot patterns. In first density range I (halftone gradation levels 0 to 6), for example, the energy required to form the center dot which constitutes pattern a1 varies from 0 to 6, to represent a total of seven halftone gradation levels, 0 to 6.

In second density range II (halftone gradation levels 7 to 18), the energy supplied to three printing dots which constitute pattern a2 varies from 7 to 18, to represent a total of twelve halftone gradation levels, 7 to 18.

In third density range III (halftone gradation levels 19 to 30), the energy supplied to five printing dots which constitute pattern a3 varies from 19 to 30, to represent a total of twelve halftone gradation levels, 19 to 30.

In fourth density range IV (halftone gradation levels 31 to 36), the energy supplied to six printing dots which constitute pattern a4 varies from 31 to 36, to represent a total of six halftone gradation levels, 31 to 36.

In a1, therefore, 37 halftone gradation levels can be produced by the 3×3 matrix. In this case, since the energy supplied to each dot varies step by step, the number of halftone gradation levels is 37. However, it is possible to produce an infinite number of halftone gradation levels by infinitely decreasing the step width.

Figure 45A:
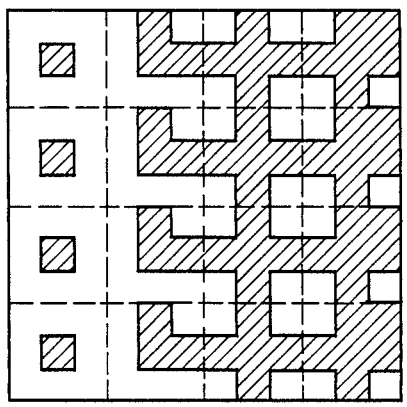
FIGS. 45A and 45B are views showing dot patterns and examples of printing according to the seventh embodiment.
Figure 45B:
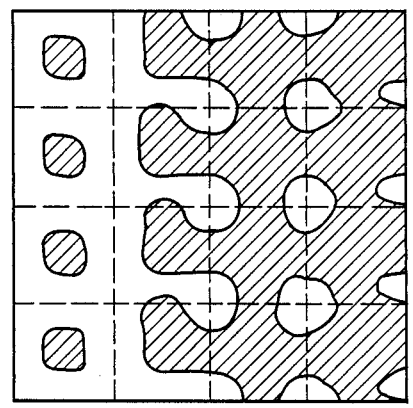
Figure 46E:
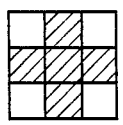
Figure 46F:
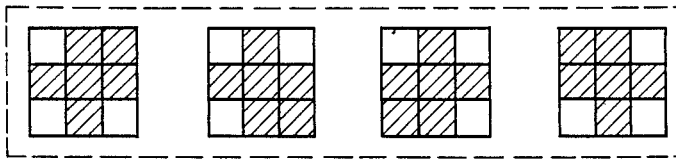
Figure 46G:
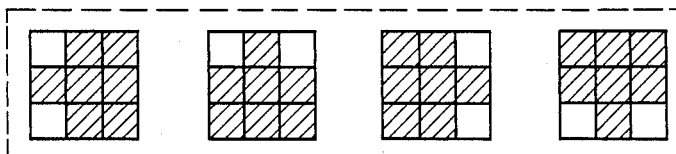
Figure 46H:
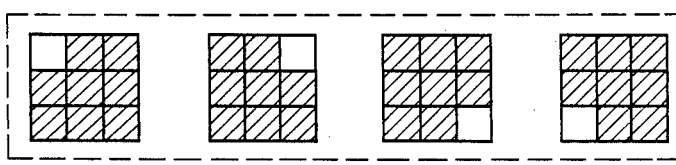
Figure 46I:
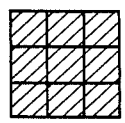

FIG. 45A is a view showing dot patterns as patterns a1 to a4 arranged along the main scanning direction, and FIG. 45B is a view showing an example of printing by use of the dot patterns shown in FIG. 45A. As is shown in FIGS. 45A and 45B, even when dot patterns having different density levels are arranged adjacent to each other along the main scanning direction, printing dots tend to be concentrated in the main scanning direction array and subscanning direction array which are common between the adjacent dot patterns, with the result that white dots of one dot pattern come into contact those of the adjacent dot pattern. Therefore, white portions tend to remain white, thereby preventing the generation of random bridges.

By adapting such dot patterns to the thermal transfer printing device having the arrangement described above, factors such as poor attachment of ink to paper and uneven density and blackening of blank portions due to a build-up of heat, all of which degrade image quality and which commonly arise when using a melting-type thermal transfer printing method, can be eliminated. Therefore, a good image without random bridges between the adjacent pixels can be obtained, and 37 halftone gradation levels can be accurately represented in a 3×3 matrix which has conventionally been able to represent only 10 gradation levels. In addition, a dot pattern of each density range can be formed by regularly adding dots to a dot pattern at the density range lower by one than that of the current density range, thus resulting in an easy dot-pattern formation.

FIGS. 46A to 46I show modifications of patterns having the same effect as that of the patterns according to the seventh embodiment of the present invention. In FIGS. 46A to 46I, the right-to-left direction is the main scanning direction, and the top-to-bottom direction is the subscanning direction. In each pattern, the reference dot is set at the center of the 3×3 matrix, and FIGS. 46A to 46I show examples of dot patterns in the respective density ranges. These dot patterns are arbitrarily combined, and dots are added to the dot patterns at the respective density ranges, in the main scanning direction and the subscanning direction both of which directions have priority over all other directions, to form the dot patterns each at a density range higher by one than that of the current density range, thereby achieving the same effect as that obtained by the seventh embodiment.

Note that in the above embodiment, reference dot P is set at the center of the matrix. However, dot P need not be centered, but may instead be set at any position of the matrix, to achieve the effect of the present invention.

FIG. 47 shows dot patterns according to the eighth embodiment of the present invention, wherein reference dot P is set at the upper left corner of the 3×3 matrix. In this case, printing dots are added to the main scanning and subscanning direction arrays which are common to dot P, as is shown by b1→b2→b3. Note that when dots are arranged all along the main scanning and subscanning direction arrays which are common to dot P in the dot matrix, printing dots are added to the other main scanning and subscanning direction arrays, to improve the density level, as is shown in patterns b4 and b5.

In addition, dot patterns capable of preventing bridges are not limited to the 3×3 matrix. For example, the dot patterns can be applied to a 4×4 matrix, as is shown in FIG. 48. FIG. 48 shows a ninth embodiment according to the present invention, in which reference dot P is arranged substantially at the center of the matrix, as is shown in pattern c0, and printing dot arrays are extended along the main scanning and subscanning directions about dot P, as is shown in patterns c1 to c5, thereby increasing the density level.

FIG. 49 shows a tenth embodiment of the present invention, in which reference dot P is set at the corner of the matrix, as is shown in pattern d0, and printing dot arrays are extended along the main scanning and subscanning directions with respect to dot P, as shown in patterns d1 to d5, thereby improving the density level.

FIG. 50 shows the assignment of dot patterns in the respective density ranges according to an eleventh embodiment of the present invention. The main characteristic of all of dot patterns e1 to e4, shown in FIG. 50, is that patterns e1 to e3 in the low and medium density ranges (I to III) are linearly symmetrical about the subscanning direction including reference dot P.

In such linearly symmetrical patterns, ink is uniformly extended along the right-to-left direction with respect to the reference dot, so that the printing pattern is well balanced along the right-to-left direction, and texture noise is effectively surpressed.

Note that pattern e2 is non-symmetrical about the main scanning direction including dot P. However, since the printing dot at the center of the matrix has expanded slightly downward due to build-up of heat in the thermal head, the printing pattern formed on the printing medium has a shape similar to that of pattern e3. Therefore, texture noise can be effectively surpressed by use of this pattern.

Although pattern e4 in the high density range is not symmetrical, since the human visual characteristics in the high density range are generally degraded compared with those in the low density range, texture noise generated by the pattern in the high density range is not so noticeable. However, when a low-resolution thermal head with a resolution of, for example, 4 dots/mm is used, patterns e1 to e3 may be used, but non-symmetrical pattern e4 may not.

FIG. 52 shows the levels of energy supplied to the respective dots when the patterns shown in FIG. 50 are used. As is shown in FIG. 52, the levels of energy supplied to the respective dots may be preferably symmetrical especially in density levels 7 to 19.

Figure 53:
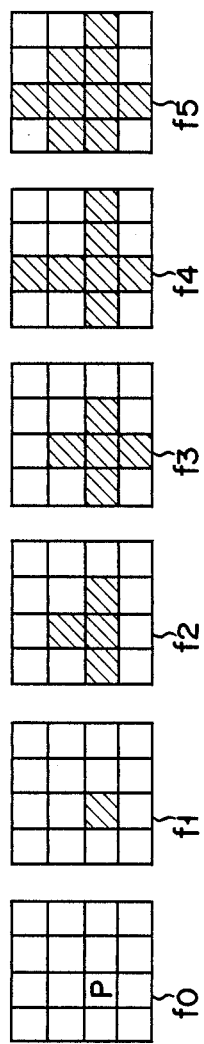
FIG. 53 is a view showing dot patterns according to a twelfth embodiment of the present invention.
Figure 54A:
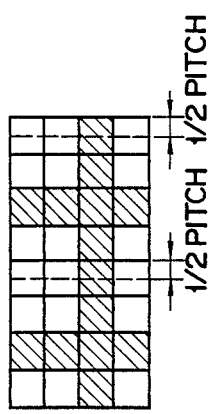
FIGS. 54A and 54B are views showing the case in which dot patterns according to the eleventh embodiment are continuously arranged.
Figure 54B:
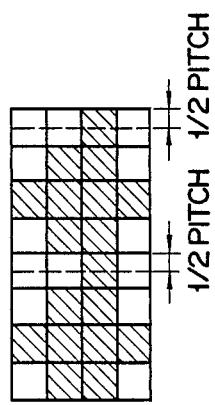

The above embodiments are not limited to the 3×3 matrix, but may also be applied to a 4×4 matrix, as is shown in FIG. 53. That is, patterns f1 to f3 are symmetrical patterns about the subscanning direction including dot P. In this case, since patterns f4 and f5 are patterns in the high density range, although they are non-symmetrical, they are not considered visually strange. In addition, as is shown in FIG. 54A or 54B, when patterns f4 and f5 are repeatedly printed a matrix frame (pixel frame) may be offset along the main scanning direction by the amount of a ½ dot, so as to obtain a symmetrical pattern, thereby suppressing generation of texture noise more effectively than the embodiment shown in FIG. 50.

Note that in the above embodiments, the present invention is applied to a melting-type thermal transfer printing method. However, the present invention can be applied to other multilevel printing methods, such as a heat-sensitive recording method.

As has been described above, according to the present invention, since dot arrays which can be printed between different dot patterns are arranged along the common main scanning and subscanning directions, no random bridge is generated between the dot patterns, thereby providing a halftone image printing device by means of which smooth halftone gradation characteristics can be obtained.

What is claimed is:
1. A halftone image printing device for printing one pixel as a dot pattern constituted by a printing dot or printing dots in a dot matrix defined by dots arranged in main scanning and subscanning directions, comprising:
   means for selecting a dot pattern among the predetermined dot patterns according to which of a plurality of density ranges, obtained by dividing an overall density range, includes a density of the pixel, said dot patterns being determined such that a dot pattern in the lowest density range is constituted by a discrete printing dot, and other dot patterns include a pattern of a one-lower density range and printing dots which are adjacent to the dot pattern of the one-lower density range in at least one of the main scanning and subscanning direction; and
   means for thermally printing the dot or dots included in the selected dot pattern, the density of each of the printed dots being multilevel and changed in accordance with a density level of the pixel.

2. A device according to claim 1, in which each of said dot patterns includes printing dots connected to a dot pattern of the lower density range in directions other than the main scanning and subscanning directions, if there is no place within the dot matrix where printing dots are connected, in either of the main scanning and subscanning directions, to the dot pattern of the lower density range.

3. A device according to claim 1, in which the dot pattern in the lowest density range includes a printing dot at the center of the dot matrix.

4. A device according to claim 1, in which said other dot patterns include an L-shaped dot pattern, whose corner is arranged at the center of the dot matrix, and a cross-shaped dot pattern, whose crossing point is arranged at the center of the dot matrix.

5. A device according to claim 1, in which said dot patterns are linearly symmetrical dot patterns.

6. A device according to claim 5, in which said dot pattern is linearly symmetrical with respect to the subscanning direction array including the center of the dot matrix.

7. A device according to claim 6, in which printing dots linearly symmetrical with each other about a subscanning direction array including the center of the dot matrix have the same printing energy.

8. A halftone image printing device for printing one pixel as a dot pattern constituted by a printing dot or printing dots in a dot matrix defined by dots arranged in main scanning and subscanning directions, comprising:

means for selecting a dot pattern among the predetermined dot patterns according to which of a plurality of density ranges, obtained by dividing an overall density range, includes a density of the pixel, said dot patterns being determined such that a dot pattern in the lowest density range is constituted by a discrete printing dot, and other dot patterns include a pattern of a one-lower density range and printing dots which are adjacent to the dot pattern of the one-lower density range, in at least one of the main scanning and subscanning direction; and means for thermally printing the dot or dots included in the selected dot pattern, the density of each of the printed dots being binary level and changed in accordance with a density level of the pixel.

9. A device according to claim 8, in which each of said dot patterns includes printing dots connected to a dot pattern of the lower density level, in directions other than the main scanning and subscanning directions, if there is no place within the dot matrix where printing dots are connected, in either of the main scanning and subscanning directions, to the dot pattern of the lower density level.

10. A device according to claim 8, in which the dot pattern in the lowest density level includes a printing dot at the center of the dot matrix.

11. A device according to claim 8, in which said other dot patterns include an L-shaped dot pattern, whose corner is arranged at the center of the dot matrix, and a cross-shaped dot pattern, whose crossing point is arranged at the center of matrix.

12. A device according to claim 8, in which said dot patterns are linearly symmetrical dot patterns.

13. A device according to claim 12, in which said dot pattern is linearly symmetrical with respect to the subscanning direction array including the center of the dot matrix.

14. A device according to claim 13, in which printing dots linearly symmetrical with each other about a subscanning direction array including the center of the dot matrix have the same printing energy.

* * * * *